US008272562B2

(12) United States Patent
Ziegler

(10) Patent No.: US 8,272,562 B2
(45) Date of Patent: Sep. 25, 2012

(54) PROMOTIONAL HANG TAG, TAG, OR LABEL COMBINED WITH PROMOTIONAL PRODUCT SAMPLE, WITH INTERACTIVE QUICK RESPONSE (QR CODE, MS TAG) OR OTHER SCAN-ABLE INTERACTIVE CODE LINKED TO ONE OR MORE INTERNET UNIFORM RESOURCE LOCATORS (URLS) FOR INSTANTLY DELIVERING WIDE BAND DIGITAL CONTENT, PROMOTIONS AND INFOTAINMENT BRAND ENGAGEMENT FEATURES BETWEEN CONSUMERS AND MARKETERS

(76) Inventor: Andrew Ziegler, River Vale, NJ (US)

( * ) Notice: Subject to any disclaimer, the term of this patent is extended or adjusted under 35 U.S.C. 154(b) by 0 days.

(21) Appl. No.: 13/195,398

(22) Filed: Aug. 1, 2011

(65) Prior Publication Data

US 2012/0085828 A1 Apr. 12, 2012

Related U.S. Application Data

(60) Provisional application No. 61/391,809, filed on Oct. 11, 2010.

(51) Int. Cl.
*G06F 17/00* (2006.01)

(52) U.S. Cl. .......... 235/375

(58) Field of Classification Search .......... 235/487, 235/375

See application file for complete search history.

(56) References Cited

U.S. PATENT DOCUMENTS

| | | | | |
|---|---|---|---|---|
| 4,496,051 | A * | 1/1985 | Ortner | 206/459.5 |
| 7,934,661 | B2 * | 5/2011 | Nichols | 235/494 |
| 2003/0004889 | A1 * | 1/2003 | Fiala et al. | 705/64 |
| 2006/0110719 | A1 * | 5/2006 | DeLack Hultin et al. | 434/365 |
| 2006/0263579 | A1 * | 11/2006 | Field | 428/198 |
| 2007/0095615 | A1 * | 5/2007 | Spector | 186/52 |
| 2007/0130013 | A1 * | 6/2007 | Robert | 705/14 |
| 2008/0267504 | A1 * | 10/2008 | Schloter et al. | 382/181 |
| 2009/0127142 | A1 * | 5/2009 | Rothstein et al. | 206/308.1 |
| 2010/0150481 | A1 * | 6/2010 | Perell et al. | 383/210 |
| 2011/0244151 | A1 * | 10/2011 | George | 428/34.1 |

* cited by examiner

*Primary Examiner* — Thien M Le
*Assistant Examiner* — Toan Ly
(74) *Attorney, Agent, or Firm* — Peter B. Scull; Hamilton, DeSanctis & Cha

(57) ABSTRACT

The present invention relates to and provides methods and promotional hang tags, tags or labels with associated product samples combined with interactive quick response or scan-able codes linked to internet Uniform (or Universal) Resource Locator (URL) for providing contact information, promotional or cross promotional product samples or products and related marketing information regarding product promotional or cross-promotional features, where the hang tag, tag or label carries any scan-able quick response internet URL code or QR code and an integral product sample, such as, but not limited to, a fragrance, a personal care product, a healthcare product, a food or beverage product, an entertainment product, a toy, a gift card, a book, an e-book, software, a website access code, an office supply product, school supply product, a travel size product, a consumer electronics product, a health and wellness product, a health and beauty product, a medical product, an educational product.

18 Claims, 36 Drawing Sheets

FIG. 13
BRAND
FRAGRANCE SAMPLE

FIG. 15A
FIG. 15B
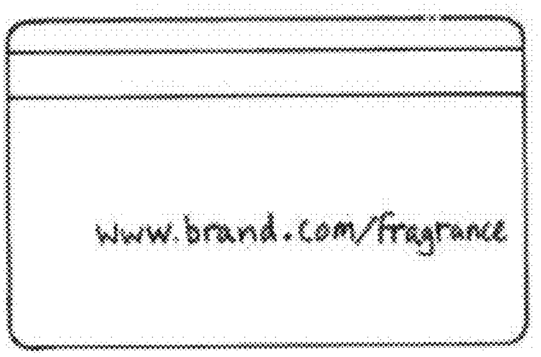
FIG. 15C

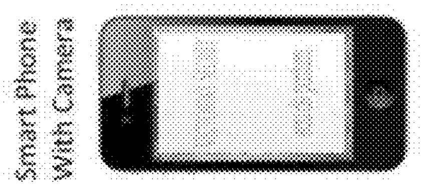
FIG 22B
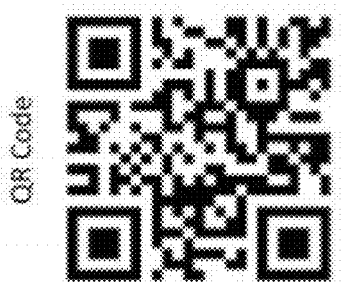
FIG 22A
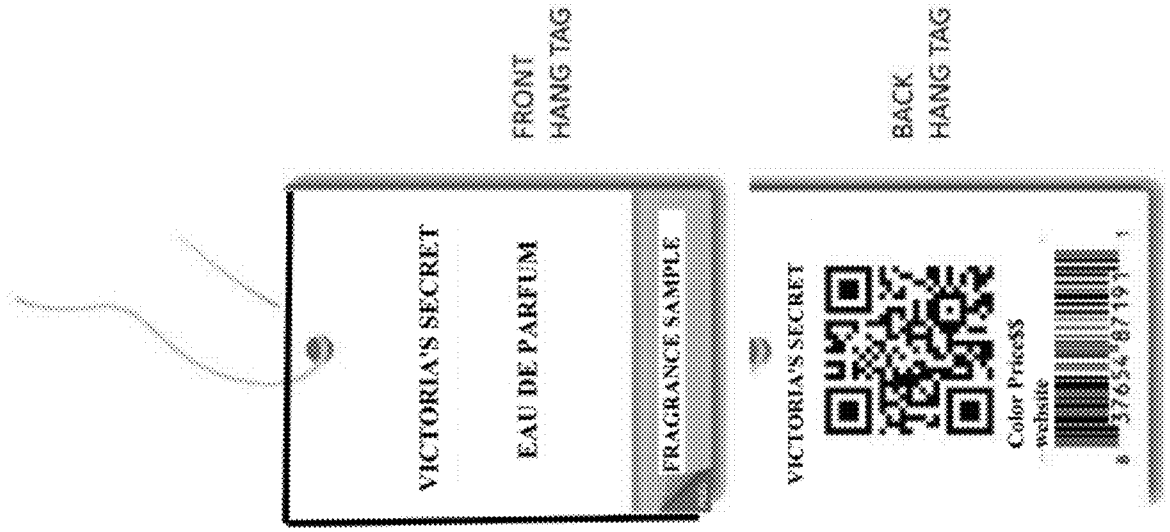

FRONT

BACK

BACK

FRONT

QR Code Premiums: Business Intelligence & Intelligent Business

Premium Samples & QR Hang Tags Extend Brand Reach Globally & Connect Customers to Reps Locally

| | | SKU# | Rep ID | Sales + May | # Scans |
|---|---|---|---|---|---|
| Fragrance | Paris: #1 Womens Fra rance Scans | 5467364 | | 54% | 6,789,674 |
| Top 3 SKU | Paris: #2 Womens Fra rance Scans | 5467492 | | 49% | 5,867,432 |
| | Paris: #3 Womens Fra rance Scans | 5467569 | | 42% | 4,546,875 |
| Clothing | London: #1 Scanned Model Blouse | 4321347 | | 65% | 8,245,698 |
| Top 3 SKU | London: #2 Scanned Model Blouse | 43 1425 | | 57% | 6,425,675 |
| | London: #3 Scanned Model Blouse | 68 | | 49% | 5,325,623 |
| Lotions | Los An eles: #1 New Lotion T e | 1 | | 42% | 11,537,249 |
| Top 3 SKU | Los An eles: #2 New Lotion T e | [illegible] | | 39% | 10,321,890 |
| | Los An eles: #3 New Lotion T | [illegible] | | 28% | 9,765,695 |
| Green Products | Sidne : #1 Matemit Mos | [illegible] | | 35% | 8,456,764 |
| Top 3 SKU | Sidney #1 Matemit F | [illegible] | | 29% | 7,679,671 |
| | Sidne : #3 Matem | [illegible] | | 27% | 6,234,573 |
| **Top QR Sales by Conversion by City** | Paris: | | 543687 | | |
| | London: | | 345279 | | |
| | New | | 237429 | | |
| Top 3 SKU Women | | 3006751 | | 53% | 14,285,351 |
| | | 4321425 | | 49% | 11,132,642 |
| | | 5467492 | | 41% | 9,237,789 |
| Top 3 SKU Men | | 1002951 | | 49% | 8,245,365 |
| | | 1003762 | | 42% | 6,456,890 |
| | | 1005853 | | 39% | 5,321,457 |
| **Special 15% Promotion Contest** | | 7775641 | | 47% | 1,557,435 |
| **Scan QR and be Entered to Win** | | 7774629 | | 54% | 1,136,530 |
| **Mobile Instant 15% Coupon Click Here** | | 7772567 | | 58% | 2,275,876 |

EXAMPLE

FIG. 32

PROMOTIONAL HANG TAG, TAG, OR LABEL COMBINED WITH PROMOTIONAL PRODUCT SAMPLE, WITH INTERACTIVE QUICK RESPONSE (QR CODE, MS TAG) OR OTHER SCAN-ABLE INTERACTIVE CODE LINKED TO ONE OR MORE INTERNET UNIFORM RESOURCE LOCATORS (URLS) FOR INSTANTLY DELIVERING WIDE BAND DIGITAL CONTENT, PROMOTIONS AND INFOTAINMENT BRAND ENGAGEMENT FEATURES BETWEEN CONSUMERS AND MARKETERS

PRIORITY CLAIM

This application claims priority to, and entirely incorporates the disclosure of, U.S. provisional application No. 61/391,809, filed Oct. 11, 2010.

FIELD OF THE INVENTION

The present invention relates to and provides methods and promotional hang tags, tags or labels with or without associated product samples combined with interactive quick response or scan-able codes linked to internet (or Universal) Resource Locator (URL) or contact information, for providing promotional or cross promotional product samples or products and related marketing information regarding product promotional or cross-promotional features, where the tag or label carries a scan-able internet URL code, or scan-able internet URL QR Code and an integral product sample.

BACKGROUND

Both manufacturers and retailers label their products with hang-tag labels that include logos, brand names, sizes, colors, pricing, promotions, sweepstakes, and bar codes for scanning product at time of sale. Moreover, they need to provide detailed product information such as material composition to customers (this is often mandated by law, depending on the product).

There are a variety of commercially available hang-tags for accomplishing the above described purpose for clothing, accessories, and other articles. Hang tags and/or labels are a useful means for conveying promotional material and/or necessary information. The typical hang-tag is a simple piece of card stock (which can be folded) and which is attached to a garment or other product by a "swift tack" (i.e., a lopped plastic fastener applied by a gun) or a string or cord threaded through the top of the tag.

Current hang-tags are primarily informational versus an actual product, limited to promotion of company brand, communicating essential information to customers such as product collection name, color style, size, and bar code that can be scanned by a cashier.

Current hang-tags are viewed as a brand billboard that catches the eye of consumers at point-of-sale, but is often discarded by the consumer when the product is brought home. Therefore, most hang-tags are designed for the sole purpose of communicating information to a potential customer solely at-time-of purchase.

Current hang-tags can convey a sweepstakes promotion, such as product registration to be entered into a drawing for prize, removable decal and/or tattoo. These types of interactive hang-tags add value to a product, when compared to traditional hang-tags whose promotional role is relegated to product information, brand information, and web site.

Any enhancement or supplement to a manufacturer's hang-tag must demonstrate additional sales promotion value to warrant minimal increased unit cost.

SUMMARY

The present invention relates to and provides methods and promotional hang tags, tags or labels with associated product samples combined with interactive quick response or scan-able codes linked to internet Uniform (or Universal) Resource Locator (URL) or contact information, for providing promotional or cross promotional product samples or products and related marketing information regarding product promotional or cross-promotional features, where the hang tag, tag or label carries any scan-able quick response or QR code and an integral product sample, such as, but not limited to, a fragrance, a personal care product, a healthcare product, a food or beverage product, an entertainment product, a toy, a gift card, a booklet, an e-book, software, a website access code, a travel size product, a consumer electronics product, digital media storage device, a health and wellness product, a health and beauty product, a medical product, an educational product, insect repellent, anti-microbial wipes or pads, medical salves, medicines, specialized health & beauty liquids, lotions, vitamins, drink flavorings, and candy, for promotional purposes. The invention makes obsolete the "inactive brand tag," replacing it with a digital encoded "interactive" promotional or cross promotional hang tag, tag or label system that has product or cross promoted product or product sample with marketing information or price on it, with additional product sample functionality, that delivers a second "brand experience" of a sample product to the consumer, as well as a third "brand experience" of a QR code or other scan-able code that links to an internet URL to provide further promotional or cross promotional features, such as, but not limited to downloadable media, promotional or cross promotional company or product websites, retail outlets, or sales representatives, products, gifts, rebates, coupons or coupon codes, discounts, sweepstakes, contests, auctions, and the like, as non-limiting examples.

The interactive QR codes, MS-Tags, or use of any other interactive URL connecting code, allows smart phone users or users of any computing device with optical scanner element to scan the code and be linked to both static data that is typically hosted by bar codes, and or specific internet URL's that can host much broader band width of data that includes text, multiple languages, audio, video, special promotions, coupons, testimonials, product specifications, MSDS documents, certifications, product demonstrations, dealer locations, retail locations, image galleries, GPS coordinates, warranty product registration forms, opt-in interactive forms.

In accordance with the above, it is an object of the present invention to provide methods and a simple, inexpensive or convenient enhancement to a conventional tag (e.g., hang-tag) so that it becomes a promotional or cross-promotional tag or label product for building additional sales and cross-marketing opportunities for marketers and manufacturers, by including, but not limited to, unique (GWP) "gift with purchase" product sample (e.g., fragrance, personal care product, health care product, or food or beverage), and interactive scan-able or quick response (QR) code or any similar scan-able code, for a smart phone (or other camera comprising device) for linking smart phone users to internet URL's for special promotions, coupons, and digital music or video content. New fragrance functionality makes the hang-tag a unique "olfactory interactive product", offering profitable cross-marketing of a brand's fragrance portfolio with fashion or non-fashion product categories. A promotional or cross-promotional tag or label of the invention (e.g., but not limited to, JetScents®) is an improved hang-tag that is intended to enhance the overall value of the attached product over competing products with conventional hang-tags.

It is another object that a promotional or cross-promotional tag or label of the invention (e.g., but not limited to, JetScents®) system can be utilized to disseminate other product samples or product promotions, e.g, including but not limited to a fragrance, apparel or garment, a sporting goods product, a personal care product, a healthcare product, a food or beverage product, an entertainment product, a toy, a gift card, a book, an e-book, software, a website access code, an office supply product, a school supply product, a travel size product, a consumer electronics product, a health and wellness product, a health and beauty product, a medical product, an educational product, insect repellent, anti-microbial wipes, medical salves, medicines, specialized health & beauty liquids, lotions, vitamins, drink flavorings, and candy.

It is another object to provide a hang-tag that will generate a secondary brand impression and interactive experience, resulting in a lasting promotional impact with a promotional or cross-promotional tag or label of the invention (e.g., but not limited to, JetScents®) hang-tag.

It is another object to provide a brand olfactory experience that will inspire viral marketing of a promotional or cross-promotional tag or label of the invention (e.g., but not limited to, JetScents® product), and brand/fragrance/products among consumers in daily interactions, and online communities such as Facebook and Twitter.

It is another object to provide a cross-marketing of free fragrance, personal care product, or food or beverage, sample with free music sample, in the form of fragrance, personal care product, or food or beverage, sample affixed to a promotional or cross-promotional tag or label of the invention (e.g., but not limited to, JetScents® product) hang tag, and music sample downloaded by either scanning a promotional or cross-promotional tag or label of the invention (e.g., but not limited to, JetScents® product)'s interactive QR-code that will direct smart phone users to specific URL where they can download a free song, or type in specific URL address printed on a promotional or cross-promotional tag or label of the invention (e.g., but not limited to, JetScents® product), where they can also download a free song or video.

It is still another object to allow retailers to integrate additional promotions and information into a promotional or cross-promotional tag or label of the invention (e.g., but not limited to, JetScents® product), even though the tag can be affixed by the manufacturer.

An object of the invention provides a promotional or cross promotional hang tag, tag or label comprising a scan-able and promotional uniform resource locator (URL)-internet directing code and a promotional product sample or product, said promotional tag or label attached to, or associated with: (i) one or more promotional or cross-promotional products or services; or (ii) one or more promotional or cross-promotional materials related to said one or more promoted or cross-promoted products or services, said promotional tag comprising:

(a) a substrate having two or more surfaces, one or more of said surfaces being optionally foldable;

(b) a scan-able URL internet directing code, said URL associated with one or more of said promotional or cross-promotional products or services, said scan-able code provided with, labeled on, affixed to, or provided in scan-able form as provided in a magnetic strip or other data storage device associated with at least one surface of said substrate;

(c) one or more sample products provided in a removable or non-removable printed area, sheet, wipe, vial, pouch, packet, patch, container, or pad associated with, or affixed to, at least a portion of a surface of the substrate; and (d) a fastener or attachment means configured to secure the substrate to an external surface or secondary product.

A further object of the invention is to provide a promotional or cross promotional tag or label, wherein said product sample is selected from one or more of the following, a fragrance, a personal care product, a healthcare product, a food or beverage product, an entertainment product, a toy, a gift card, a booklet, an e-book, software, a website access code, a licensed product, an office supply product, a school supply product, a travel size product, a consumer electronics product, a health and wellness product, a health and beauty product, a medicine product, or an educational product.

A further object of the invention is to provide a promotional or cross promotional hang tag, tag or label, wherein said product sample is in the form of a solid, a liquid, a gel, an aerosol, a spray, a powder, a pill, a composition, a freeze-dried product, a dehydrated product, a desicated product, a compound, electronics, recordable memory, or any combination thereof.

A further object of the invention is to provide a promotional or cross promotional hang tag, tag, or label, wherein said substrate is selected from paper, plastic, foil, foil coated paper, cardboard, wood, metal, glass, a polymer, cellulose, a postcard, cardstock, or a combination thereof, for which at least a portion of said substrate can optionally be folded, perforated, perforated for tear off demarcations, attached to or provided with a mailed or an electronic bill or statement, detachable, re-attachable, stackable with other portions, or associated with at least one tie-back, cord, pin, fastener, or tie.

A further object of the invention is to provide a promotional or cross promotional hang tag, tag, or label, wherein said printed area, sheet, wipe, vial, pouch, packet, patch, container, or pad further comprises one or more of the following attributes that include a peelable, resealable, closable, re-attachable or removable sheet, removable pad, cover, latch, cap, top, container, or membrane that releases the scent of said one or more products or product samples when peeled, opened, exposed, or removed.

A further object of the invention is to provide a promotional or cross promotional, hang tag, tag, or label, wherein said substrate is labeled with one or more brands or product or service descriptions, logos, trademarks, websites, retail locations, said scan-able code, or contact information.

A further object of the invention is to provide a promotional or cross promotional hang tag, wherein said hang tag, tag, or label, wipe, sheet, vial, packet, pouch, or pad is removably affixed to said substrate with a fixative, glue, cut out, latch, or sticky material or compound.

A further object of the invention is to provide a promotional or cross promotion hang tag, tag, or label, wherein said fragrance compound can be applied to a user's skin or clothing to continue to smell, effect, or experience of said one or more products after removal from said promotional tag.

A further object of the invention is to provide a promotional or cross promotional hang tag, tag or label, wherein said one or more fragrances are provided in said vial or container, which can optionally be reattached or re-associated with said promotional tag for multiple uses.

A further object of the invention is provide a promotional or cross promotional hang tag, tag or label, wherein said promotional code provides access to the user of at least one selected from a sweepstakes promotion, a rebate, a gift with purchase (GWP), a coupon, a contest, a marketing promotion, a downloadable or orderable free or fee charged music or video, a retail location or a GPS location, a website, an internet URL, a rebate, registration information, or contact information.

A further object of the invention is provide a promotional or cross promotional hang tag, tag or label, wherein said GWP is selected from any product or service, a rebate, a coupon, a promotion, or downloadable or physical audio or video media.

A further object of the invention is provide a promotional or cross promotional tag or label, wherein said scan-able code is selected from a bar code, a quick response (QR) code, an alphanumeric code, a programmable code, a machine readable code or a readable code image.

A further object of the invention is provide a promotional or cross promotional tag or label, wherein said scan-able code provides quick response internet or telephone access to promotional material or to a product or service provider or promoter website, telephone number, retail location, or contact information.

A further object of the invention is provide a promotional or cross promotional tag or label, wherein said promotional tag is sold or provided as: (i) as a stand alone product, (ii) at retailers in stores and online, or (iii) distributed for free as promotional materials.

A further object of the invention is provide a promotional or cross promotional tag or label, wherein said promotional tag is provided to a consumer or end user as a form selected from: a lanyard, a cord, a necklace, a bracelet, earrings, a toy, apparel, footwear, keychain, brochure, handout, writing instrument, or novelty promotional item.

A further object of the invention is to provide a promotional or cross promotional tag or label, wherein said promotional tag further comprises, is affixed, is associated, or is provided with: (i) a product or service gift card, promotion card, internet download card, media download card; label, and hanging card.

A further object of the invention is to provide a promotional or cross promotional hang tag, tag or label, wherein said promotional tag is sold at airports, mass transport stations, and retailers promoting travel size medicines and personal care or health & beauty products.

A further object of the invention is to provide a promotional or cross promotional hang tag, tag or label, wherein said promotional tag is sold in any retail, wholesale or internet sales environment, wherein said environment can optionally be selected from supermarkets, gift stores, convenience stores, department stores, fragrance stores, electronic stores, clothing stores, drug stores, sports goods stores, and restaurants.

A further object of the invention is to provide a promotional or cross promotional hang tag, tag or label, wherein said tag is used as a hanging tag for providing a message to third parties in addition to the promotional message, product or scan-able code.

A further object of the invention is to provide a method of providing a promotional or cross promotional tag, hang tag, or label comprising a scan-able and promotional uniform resource locator (URL)-internet directing code and a promotional product sample, said promotional tag or label attached to, or associated with: (i) one or more promotional or cross-promotional products or services; or (ii) one or more promotional or cross-promotional materials related to said one or more promoted or cross-promoted products or services, said method comprising:

(a) providing, making or using said promotional or cross promotional tag or label, said promotional or cross promotional tag or label comprising:
   i. a substrate having two or more surfaces, one or more of said surfaces being optionally foldable;
   ii. a scan-able URL internet directing code, said URL associated with one or more of said promotional or cross-promotional products or services, said scan-able code provided with, labeled on, affixed to, or provided in scan-able form as provided in a magnetic strip or other data storage device associated with at least one surface of said substrate;
   iii. one or more sample products provided in a removable or non-removable printed area, sheet, wipe, vial, pouch, packet, patch, container, or pad associated with, or affixed to, at least a portion of a surface of the substrate; and
   iv. a fastener or attachment means configured to secure the substrate to an external surface or secondary product.

According to the present invention, the above described and other objects are accomplished by expanding the function of the hang tag to include either printed fragrance laced inks on a promotional or cross-promotional hang tag, tag or label of the invention (e.g., but not limited to, JetScents® product), or affixing a fragrance sample such as printed area, sheet, wipe, vial, pouch, packet, patch, container, or pad sample to the tag surface, health and beauty sample, or food and beverage sample, whereby the brand experience can be transported from the retail store environment back to the customer's home where they can experience the brand's "fragrance products" at leisure (printed peel-up printed scent sample), or apply the one-time-use fragrance via foil packet wipe or pad on their body.

The present invention further provides any invention described herein

BRIEF DESCRIPTION OF THE DRAWINGS

(FIG. 1C).

Figure 1A:
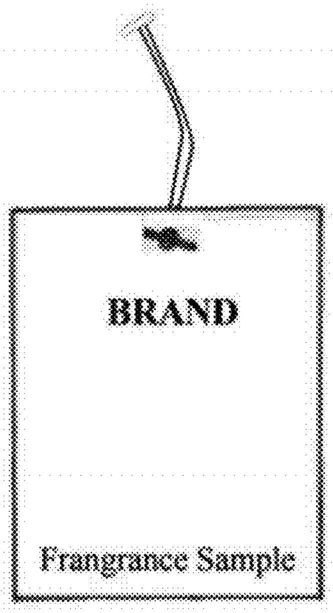
FIG. 1A-C: A promotional or cross-promotional hang tag, tag or label of the invention (e.g., but not limited to, JetScents® product) with removable fragrance wipe or pad sample (FIG. 1A) affixed with glue adhesive inside folding card (FIG. 1B) with hole for hanging and attaching to other products. Back of tag has product information as well as scan-able barcode or QR Code.
Figure 1B:
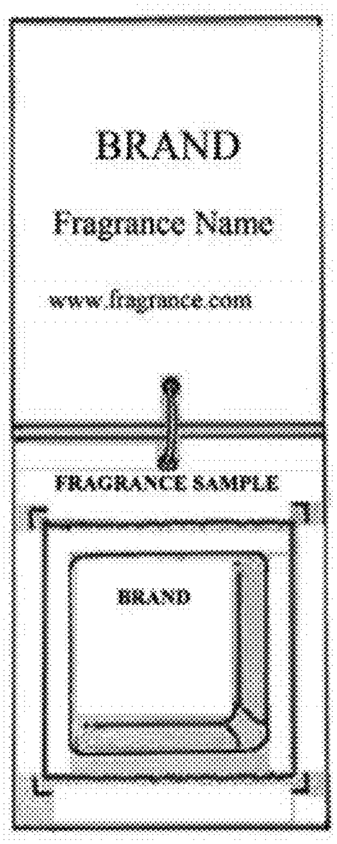
Figure 1C:
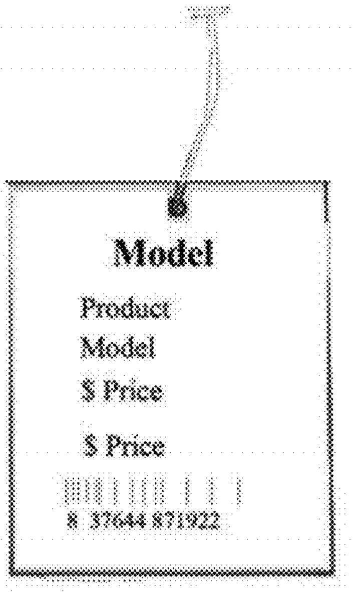
Figure 1D:
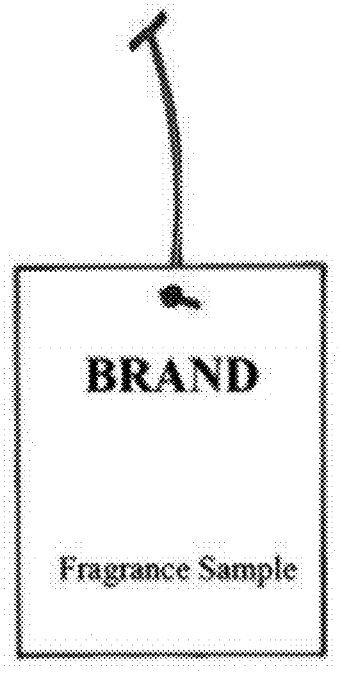
FIG. 1D-F: A promotional or cross-promotional hang tag, tag or label of the invention (e.g., but not limited to, JetScents® product) with removable fragrance wipe or pad sample (FIG. 1D) affixed with glue adhesive inside folding card (FIG. 1E) with hole for hanging and attaching to other products. Back of tag has product information (FIG. 1F).
Figure 1E:
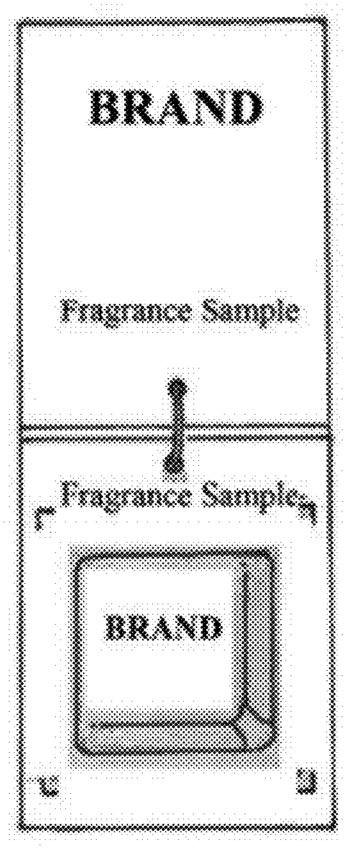
Figure 1F:
Figure 2:
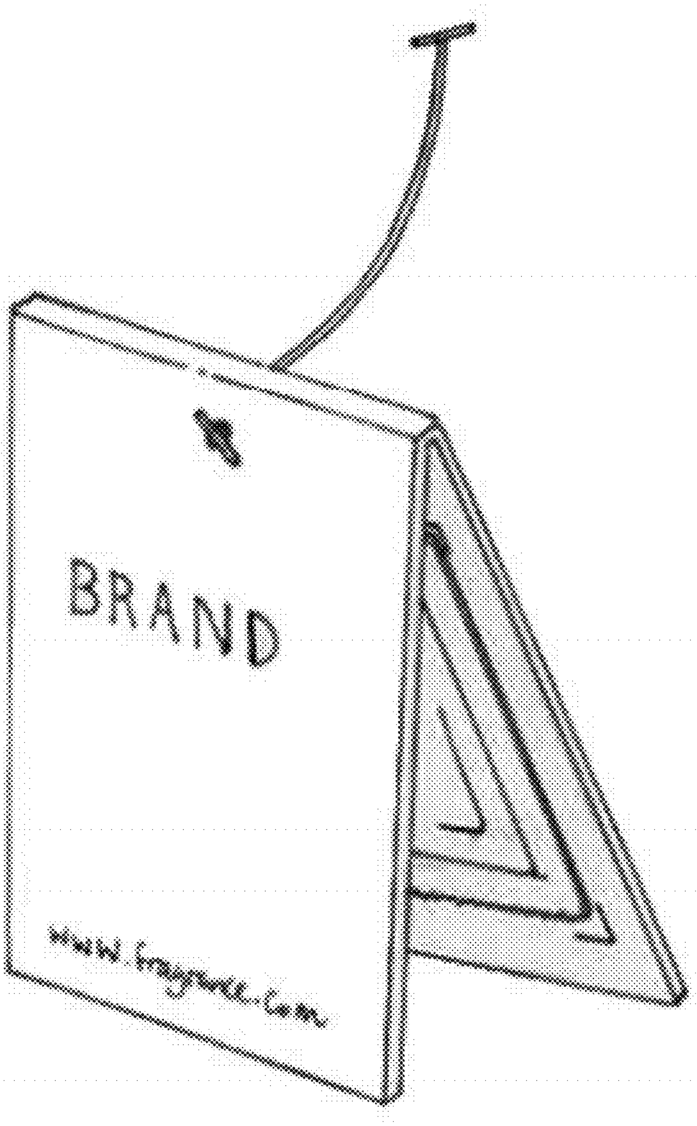
FIG. 2: Additional view of folding paper or plastic card stock with fragrance wipe or pad sample adhered inside hang tag.
Figure 3:
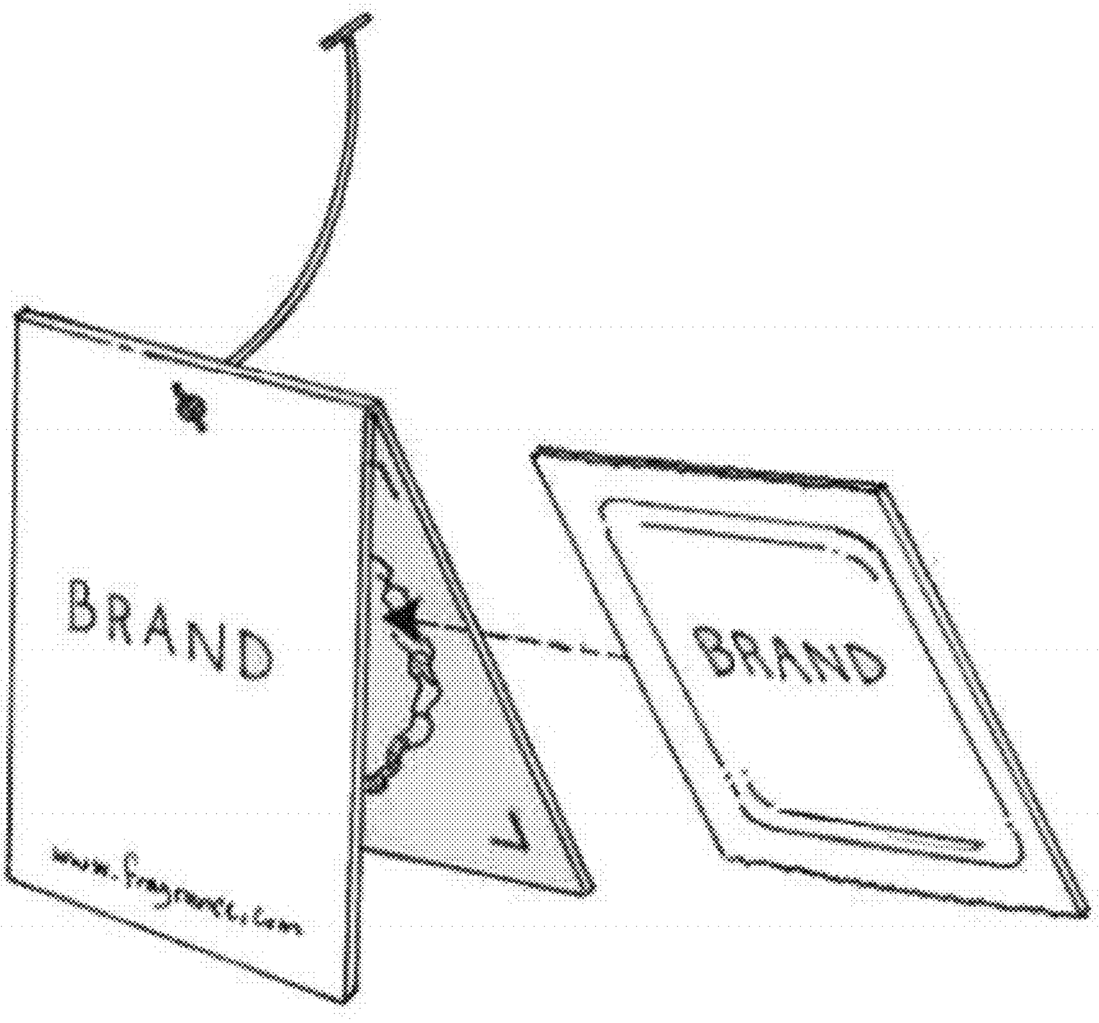
FIG. 3: Additional view of folding paper or plastic card stock showing how fragrance wipe or pad sample is adhered inside hang tag with glue spot.
Figure 4:
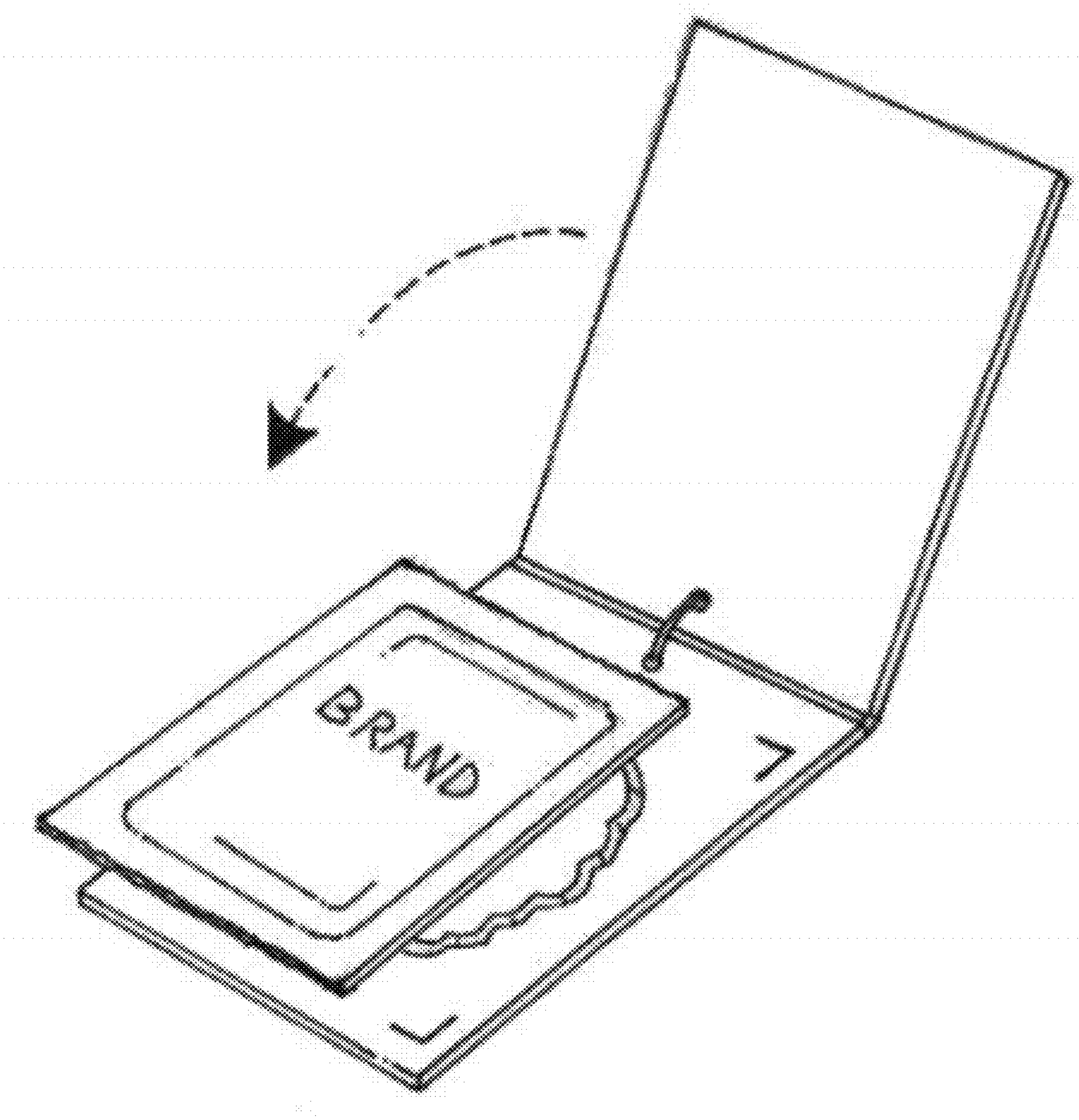
FIG. 4: Additional view of folding paper or plastic card stock showing how fragrance wipe or pad sample is adhered inside hang tag with glue spot.
Figure 5A:
FIG. 5A-C: A promotional or cross-promotional hang tag, tag or label of the invention (e.g., but not limited to, JetScents® product) with printed fragrance sample (FIG. 5A).
Figure 5B:
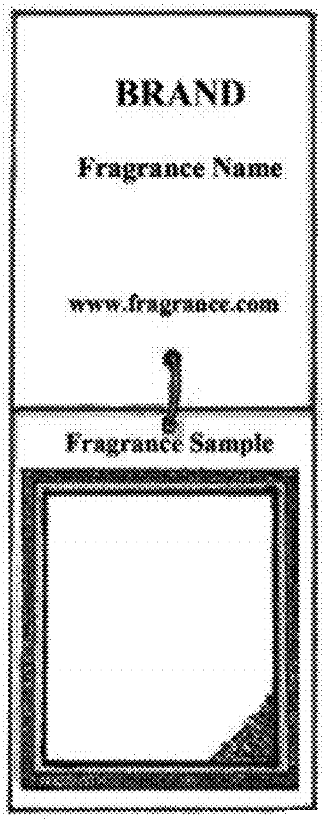
Figure 5C:

sealed inside folding paper or plastic tag (FIG. 5B). with hole for hanging and attaching to other products. Back of hang tag has product information as well as scan-able barcode or QR-Barcode (FIG. 5C).

Figure 5D:
Figure 5E:
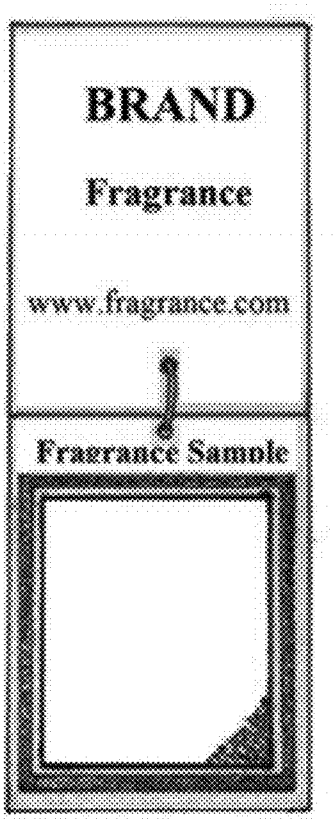
Figure 5F:

FIG. 5D-F: A promotional or cross-promotional hang tag, tag or label of the invention (e.g., but not limited to, JetScents® product) with printed fragrance sample (FIG. 5D). sealed inside folding paper or plastic hang tag (FIG. 5E). with hole for hanging and attaching to other products. Back of hang tag has product information such as model, color, price, website address (FIG. 5F).

Figure 6:
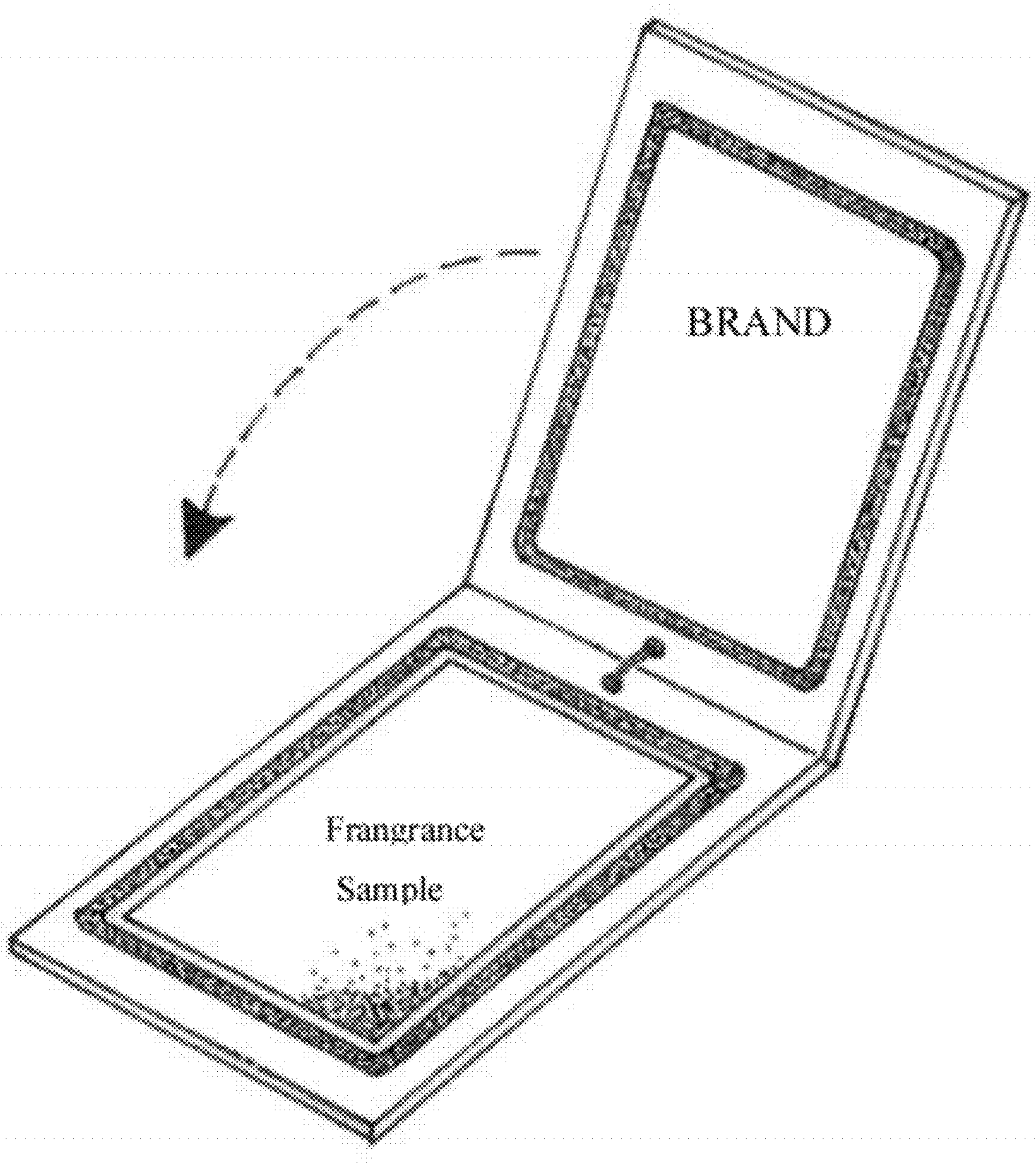

FIG. 6: A promotional or cross-promotional hang tag, tag or label of the invention (e.g., but not limited to, JetScents® product) with printed fragrance sample sealed inside folding paper or plastic card with hole for hanging and attaching to other products. This detail shows printed fragrance rectangular field, and adhesive that seals the two sides of the folding tag together.

Figure 7:
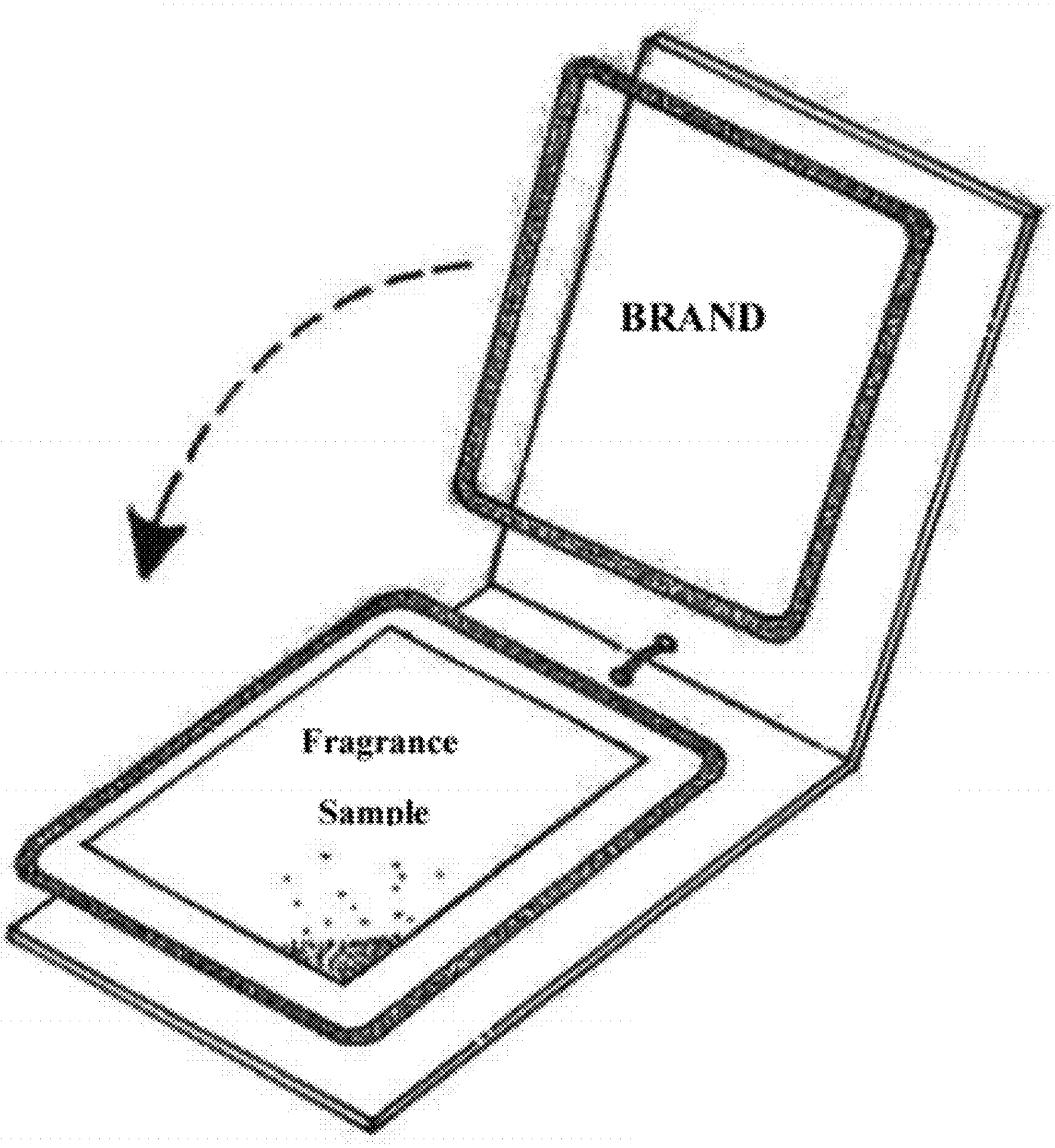

FIG. 7: A promotional or cross-promotional hang tag, tag or label of the invention (e.g., but not limited to, JetScents® product) with printed fragrance sample sealed inside folding paper or plastic card with hole for hanging and attaching to other products. This detail shows printed fragrance rectangular field, and adhesive that seals the two sides of the folding tag together.

Figure 8:

FIG. 8: JetScents®) hang tag with sealed printed fragrance sample or removable fragrance wipe, or any removable sealed fragrance, personal care product, or food or beverage, sample inside A promotional or cross-promotional tag or label of the invention (e.g., but not limited to, JetScents® product), shown is this figure (shown attached to exemplary item as shirt) with optional forms of attachment such as pins, bobby pins, swift tack plastic cords, wire or natural cord, and areas of attachment typically used by retailers or manufacturers to attach hang tags to clothing.

Figure 9:
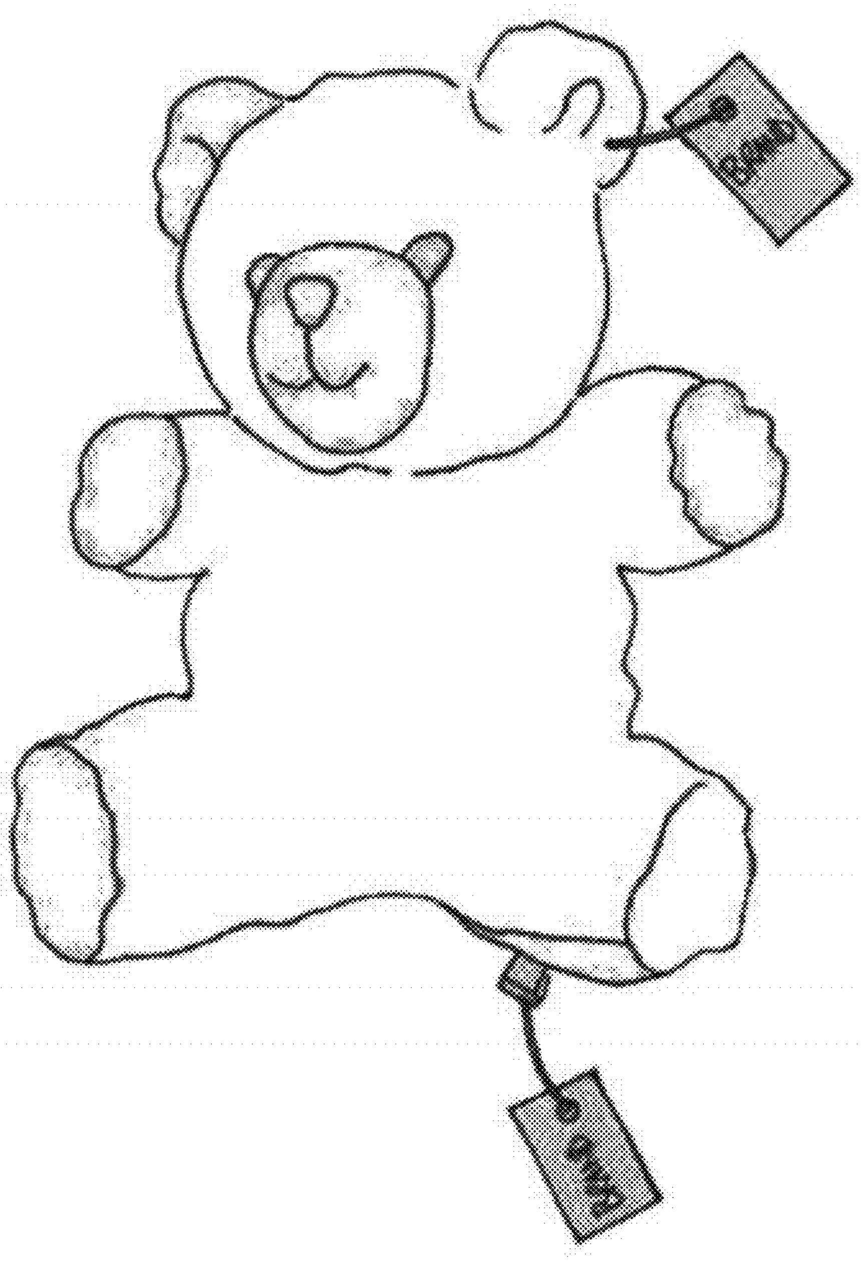

FIG. 9: A promotional or cross-promotional hang tag, tag or label of the invention (e.g., but not limited to, JetScents® product) with sealed printed fragrance sample or removable fragrance wipe, or any removable sealed fragrance delivery system including pad, personal care product, or food or beverage, sample inside A promotional or cross-promotional tag or label of the invention (e.g., but not limited to, JetScents® product), shown is this figure with optional areas of attachment typically used by retailers or manufacturers to attach hang tags to toys, novelty items, or any consumer product (shown attached to exemplary item as teddy bear).

Figure 10A:
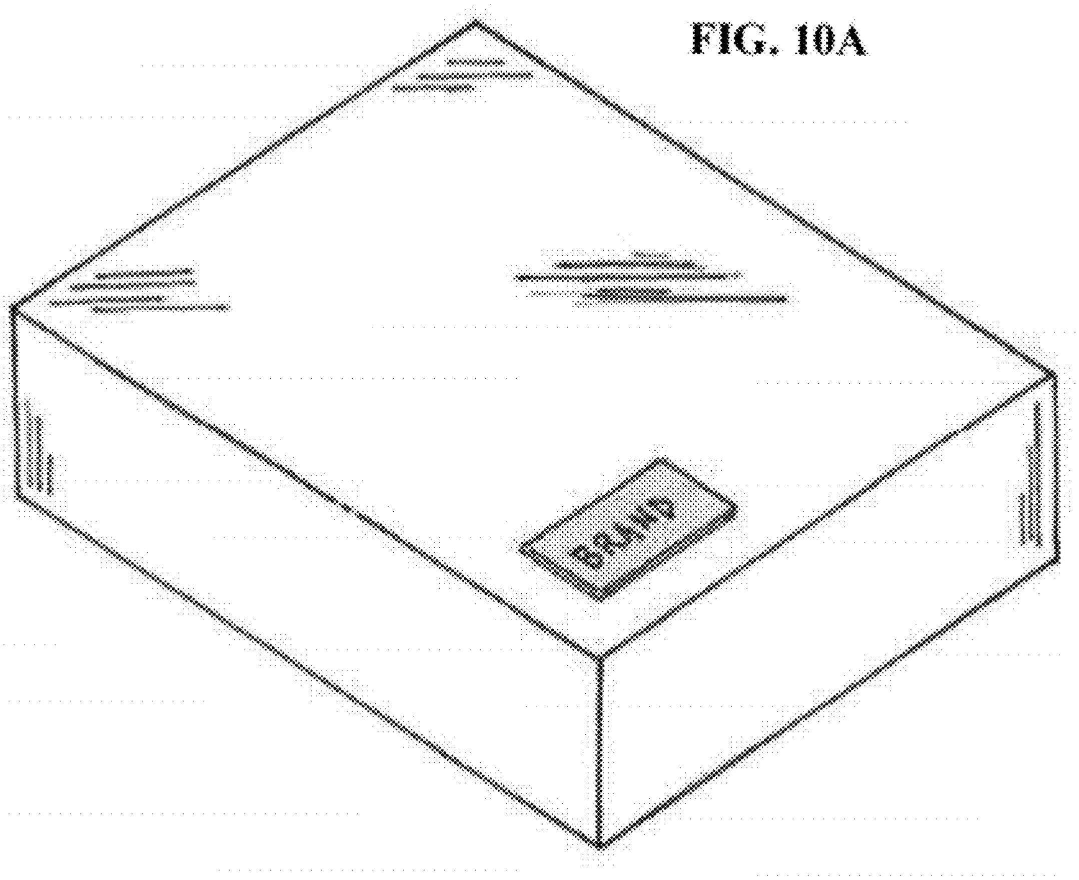
Figure 10B:
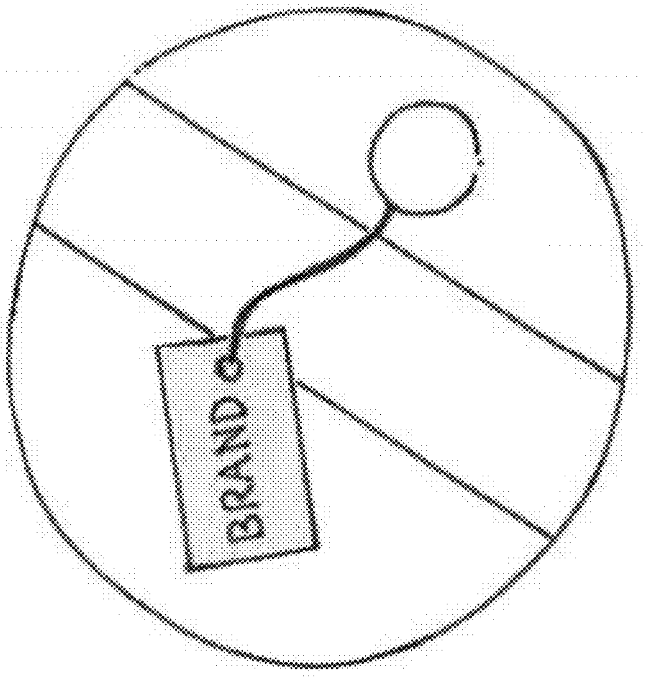

FIG. 10A-B: A promotional or cross-promotional hang tag, tag or label of the invention (e.g., but not limited to, JetScents® product) with sealed printed fragrance sample or removable fragrance wipe or pad, or any removable sealed fragrance, personal care product, or food or beverage, sample inside A promotional or cross-promotional tag or label of the invention (e.g., but not limited to, JetScents® product), shown is this figure attached to gift boxes with separate glue adhesive (FIG. 10A), or with adhesive label affixed over hang tag cord (FIG. 10B).

Figure 11:
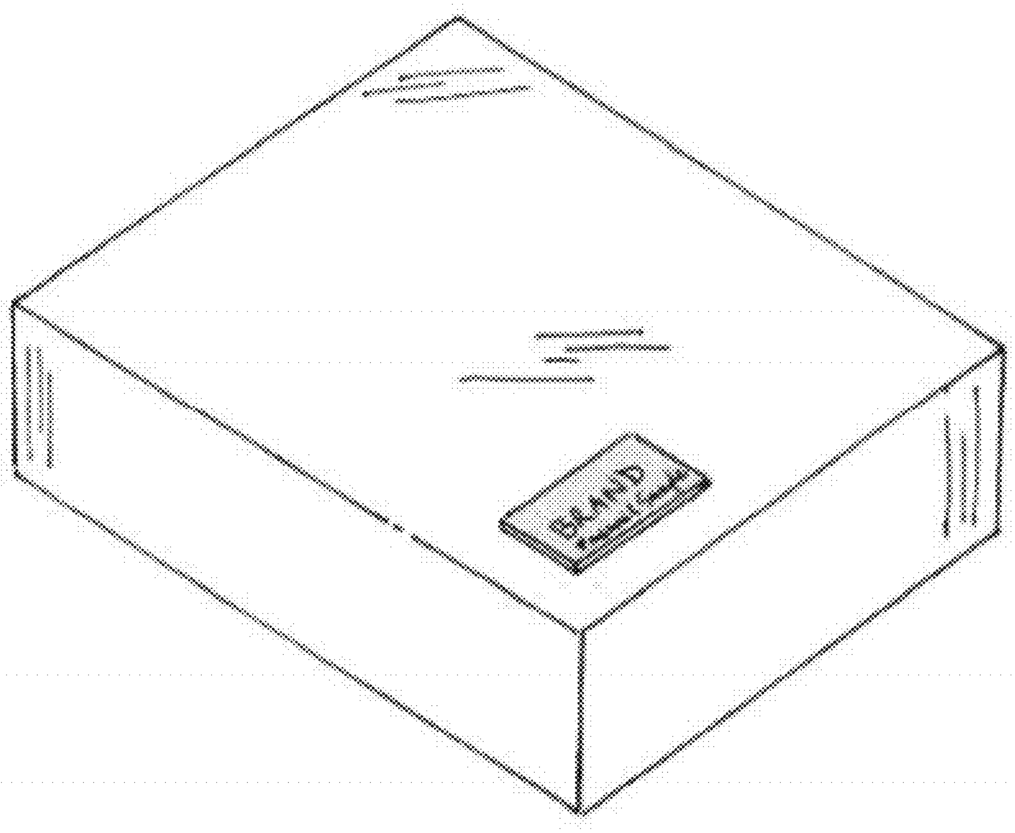

FIG. 11: A promotional or cross-promotional hang tag, tag or label of the invention (e.g., but not limited to, JetScents® product) with sealed printed fragrance sample or removable fragrance wipe or pad, or any removable sealed fragrance, personal care product, or food or beverage, sample inside A promotional or cross-promotional hang tag, tag or label of the invention (e.g., but not limited to, JetScents® product), shown is this figure attached to gift box with separate glue adhesive.

Figure 12:
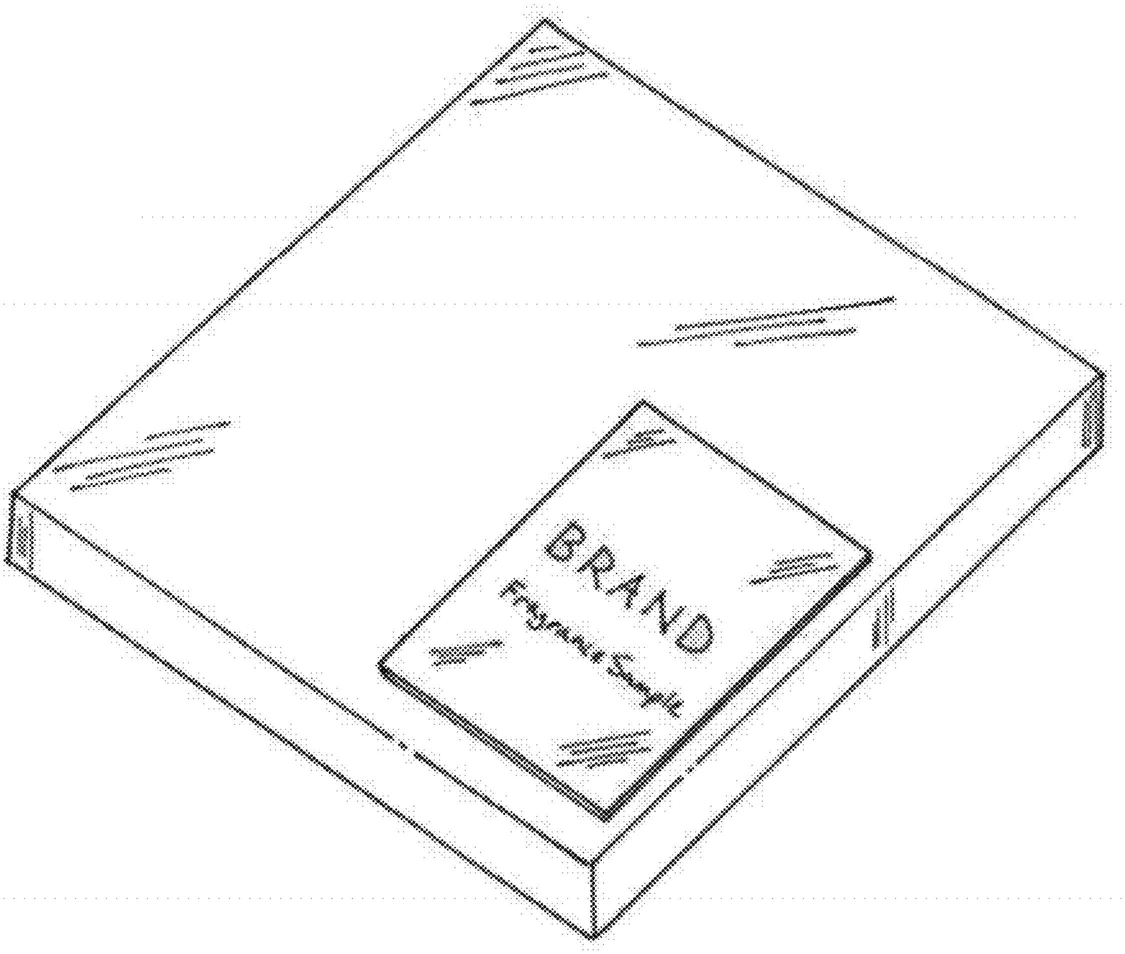

FIG. 12: A promotional or cross-promotional tag or label of the invention (e.g., but not limited to, JetScents® product) with sealed printed fragrance sample or removable fragrance wipe, or any removable sealed fragrance, personal care product, or food or beverage, sample inside A promotional or cross-promotional tag or label of the invention (e.g., but not limited to, JetScents® product), shown is this figure inserted and sealed underneath plastic wrap around music CD, or affixed on top with separate adhesive.

Figure 13:

FIG. 13: A promotional or cross-promotional tag or label of the invention (e.g., but not limited to, JetScents® product) with sealed printed fragrance sample or removable fragrance wipe, or any removable sealed fragrance, personal care product, or food or beverage, sample inside A promotional or cross-promotional hang tag, tag or label of the invention (e.g., but not limited to, JetScents® product), shown is this figure affixed to can of soda or alcoholic beverage can such as beer can, via a plastic or natural material cord, or a promotional or cross-promotional tag or label of the invention (e.g., but not limited to, JetScents® product) can be affixed in same manner with cord to beverage carton, or corded tag can be looped around neck of wine bottles.

Figure 14:
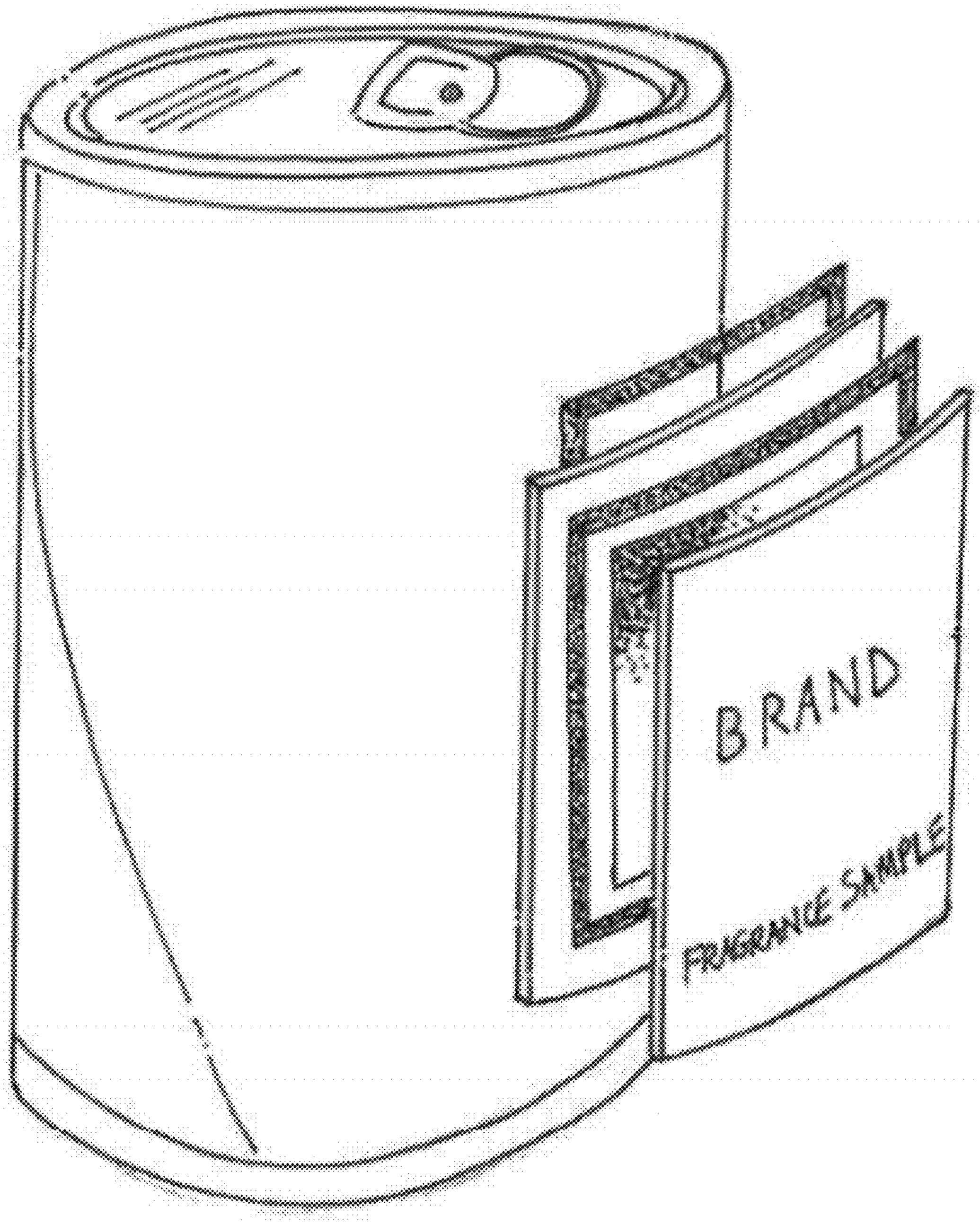

FIG. 14: A promotional or cross-promotional tag or label of the invention (e.g., but not limited to, JetScents® product) can be affixed to bottles or cans if manufacturer applies adhesive first on bottle or can, and then applies a promotional or cross-promotional tag or label of the invention (e.g., but not limited to, JetScents® product).

FIG. 15A-C: A promotional or cross-promotional tag or label of the invention (e.g., but not limited to, JetScents® product) sealed printed fragrance sample (FIG. 15B) or single use fragrance wipe (FIG. 15A), or any sealed fragrance, personal care product, or food or beverage, sample, shown is this figure affixed to plastic or paper gift card, offered as free gift with purchase when purchasing gift card (FIG. 15C).

Figure 16A:
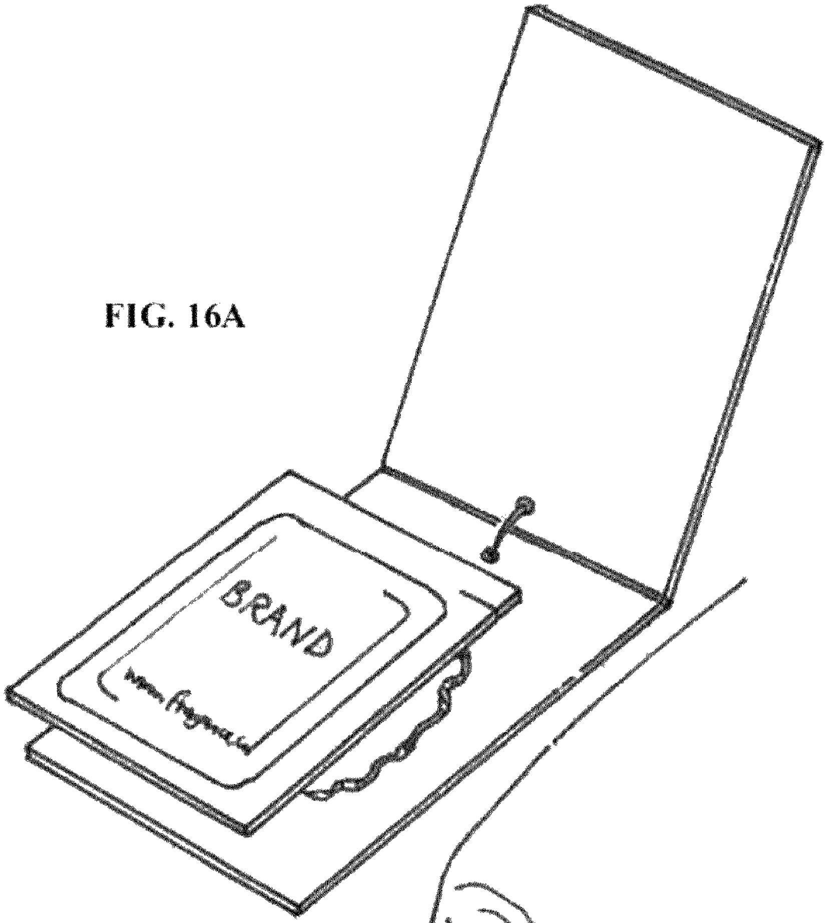
Figure 16B:
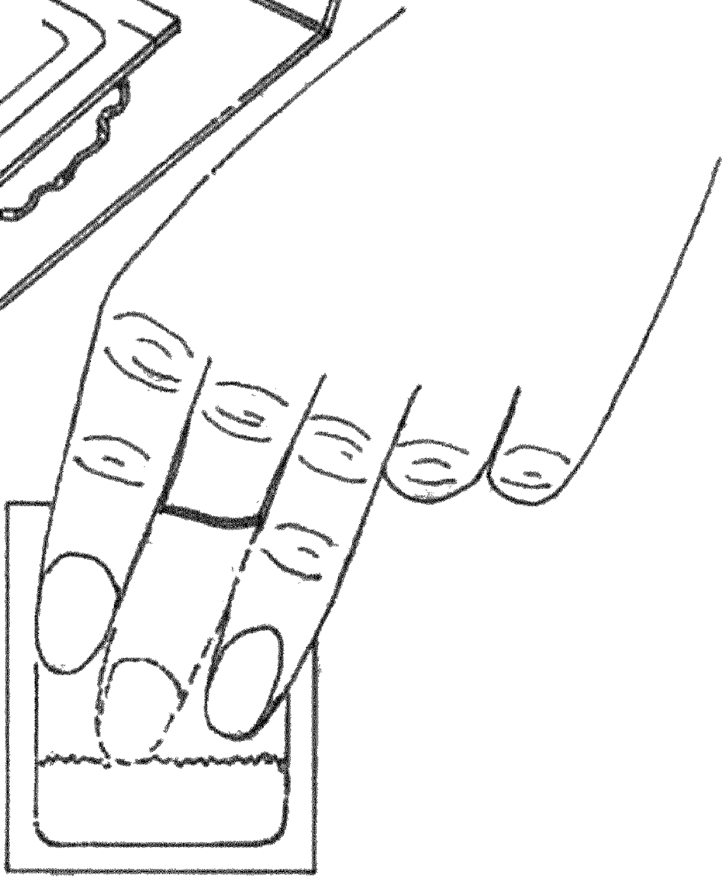

FIG. 16A-B: A promotional or cross-promotional hang tag or label of the invention (e.g., but not limited to, JetScents® product) with removable sealed pouch of liquid fragrance, personal care product, or food or beverage, sample, shown is this figure attached to hang tag with glue adhesive (FIG. 16A), removable by user (FIG. 16B).

Figure 17B:
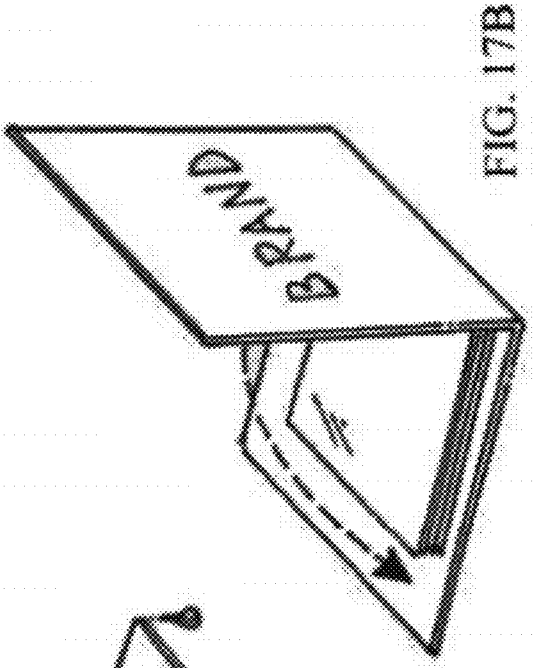
Figure 17A:
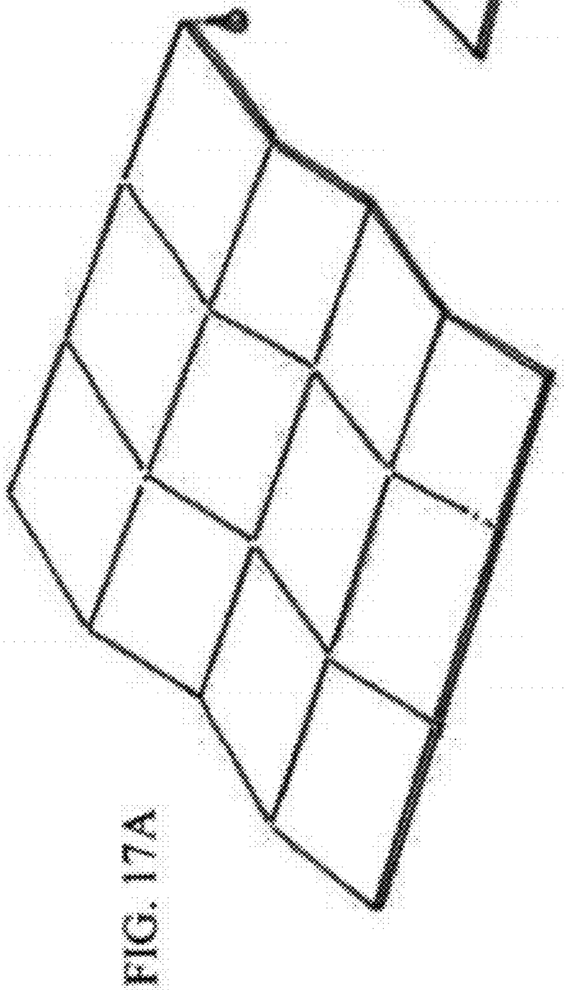
Figure 17C:
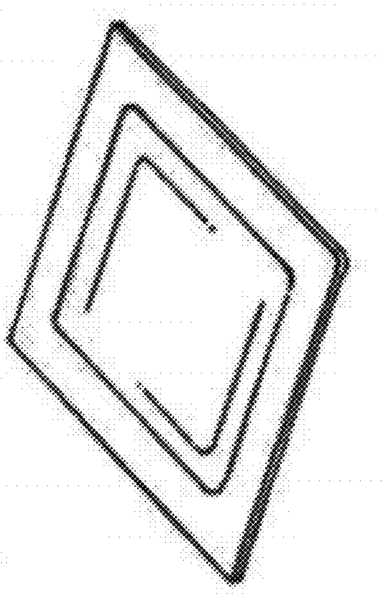
Figure 18A:
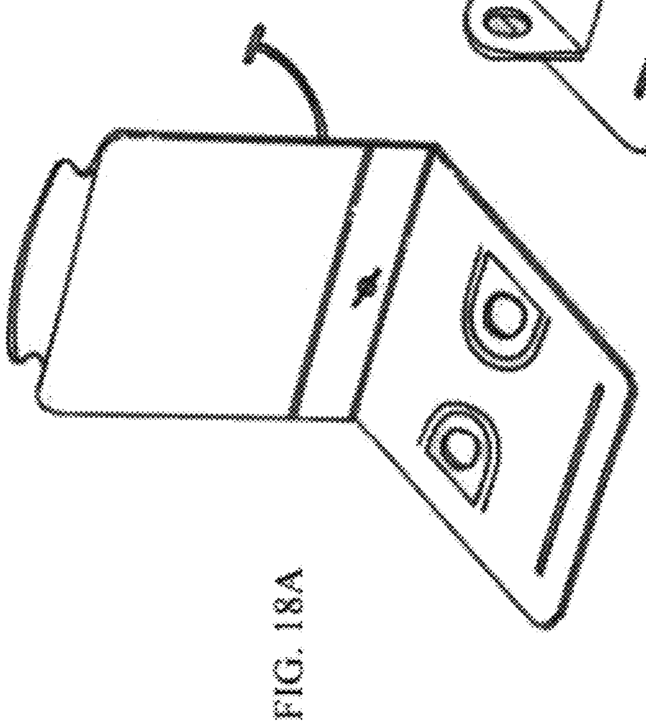
Figure 18B:
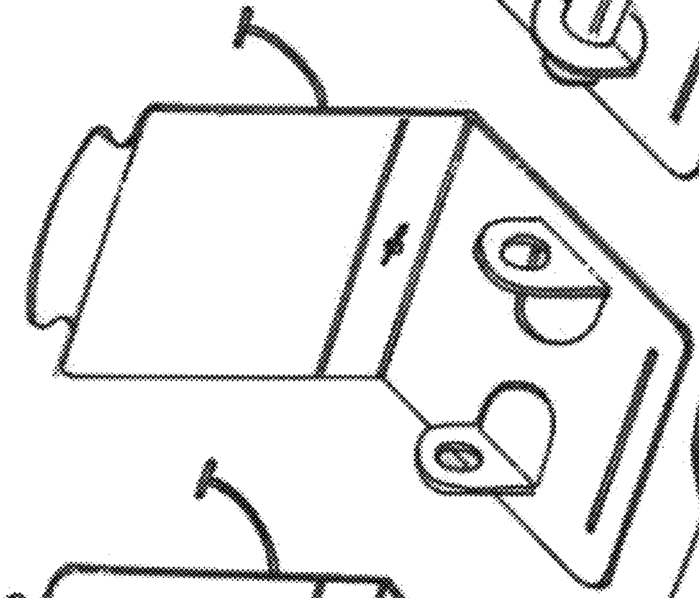
Figure 18C:
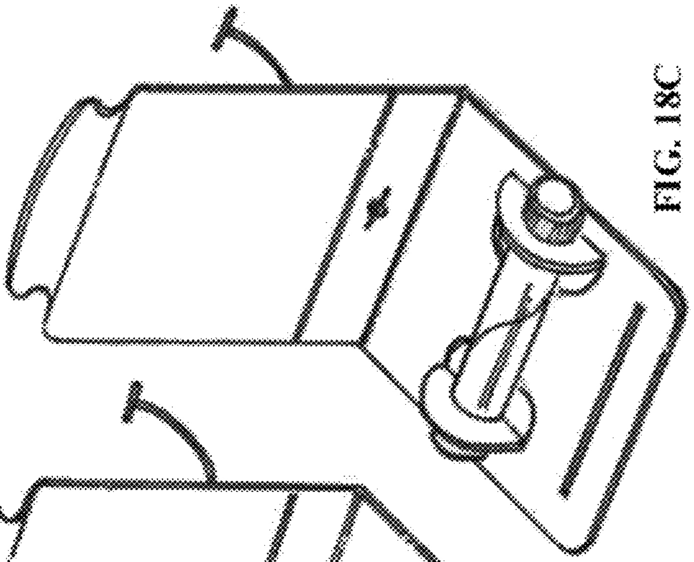
Figure 18D:
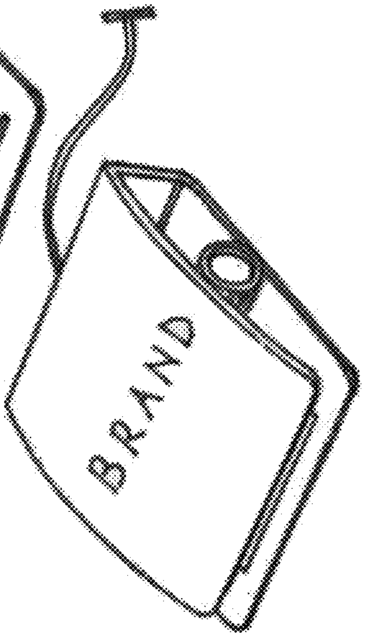

FIG. 17A-C: A promotional or cross-promotional tag or label of the invention (e.g., but not limited to, JetScents® product) fragrance wipe impregnated with liquid fragrance (FIG. 17A), folded, and sealed inside foil lined packet. Packet can be glued onto hang tag, glued onto plastic or paper gift card (FIG. 17B), inserted into gift box, or sold as single stand alone unit (FIG. 17C).

FIG. 18A-D: A promotional or cross-promotional hang tag, tag or label of the invention (e.g., but not limited to, JetScents® product) fragrance tag (FIG. 18D) made from paper or plastic stock, with die cuts (FIG. 18A) that pop up (FIG. 18B) to hold glass, metal, or plastic vile (FIG. 18C) of liquid or product sample (e.g., fragrance, lotion, medicine, cold remedies, vitamins).

Figures 19A, 19B:
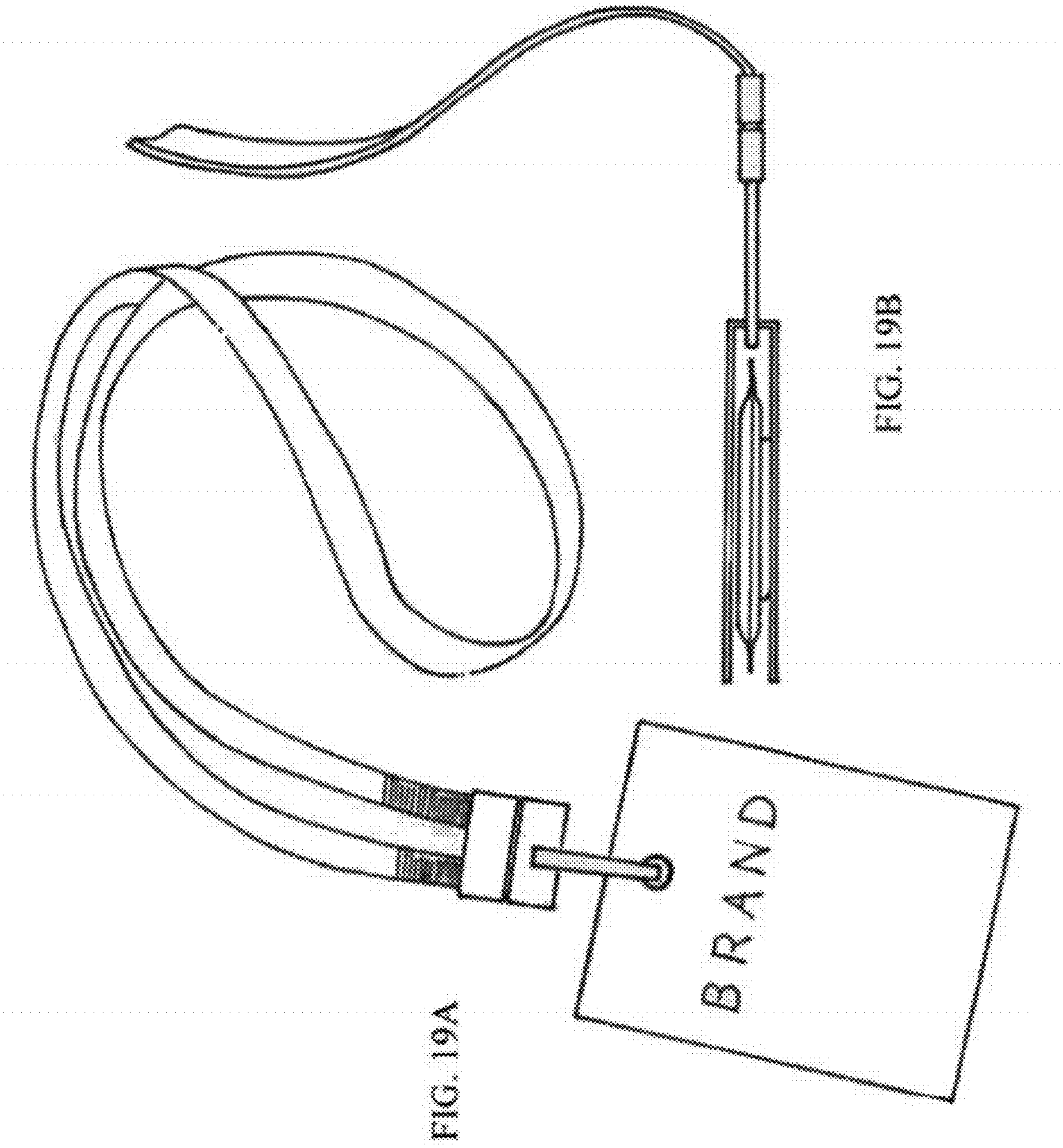

FIG. 19A-B: A promotional or cross-promotional hang tag, tag or label of the invention (e.g., but not limited to, JetScents® product) (FIG. 19A-B, front and side views) with sealed printed fragrance sample or removable fragrance wipe or pad, or any removable sealed fragrance, personal care product, or food or beverage, sample inside A promotional or cross-promotional tag or label of the invention (e.g., but not limited to, JetScents® product), with additional hang-tag features of printed interactive QR Quick Response code or similar internet URL embedded code that allows consumers to scan a promotional or cross-promotional tag or label of the invention (e.g., but not limited to, JetScents® product) with their smart phone to get instant download of coupons, music, videos, or special promotions. A promotional or cross-promotional tag or label of the invention (e.g., but not limited to, JetScents® product) is attached to lanyard, cord, or chain necklace, to be sold as branded promotional premium item, or as stand alone product.

Figure 20A:
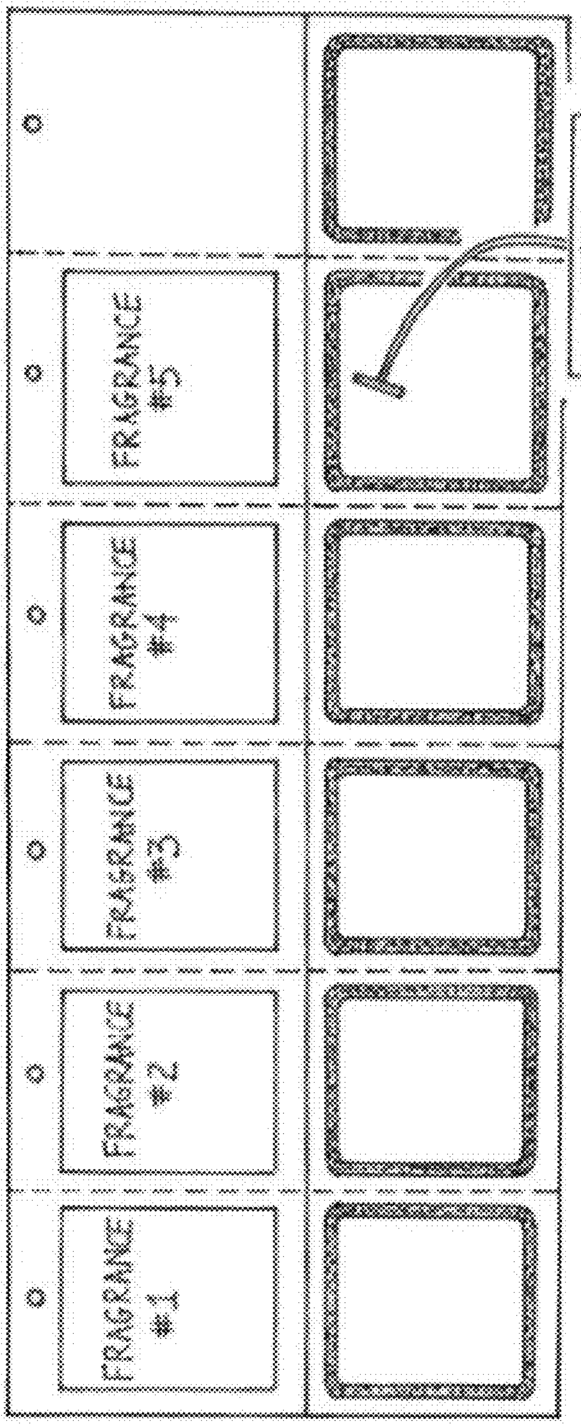
Figure 20B:
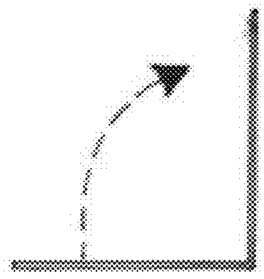
Figure 20C:
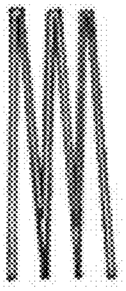
Figure 20D:
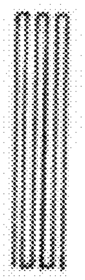
Figure 20E:
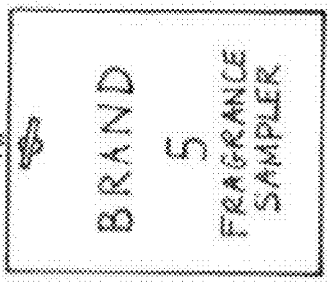

FIG. 20A-E: A promotional or cross-promotional hang tag, tag or label of the invention (e.g., but not limited to, JetScents® product) (FIG. 20A) with either multiple printed fragrances or multiple fragrance wipes or pads, folded in accordion style (FIG. 20B-D), so as to become a compact multiple fragrance sampler as a promotional or cross-promotional tag or label of the invention (e.g., but not limited to, JetScents® product) (FIG. 20E).

Figure 21A:
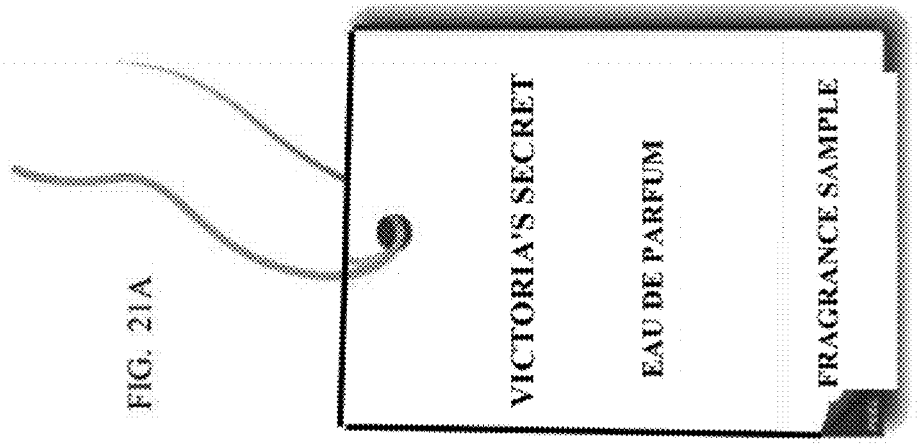
Figure 21B:
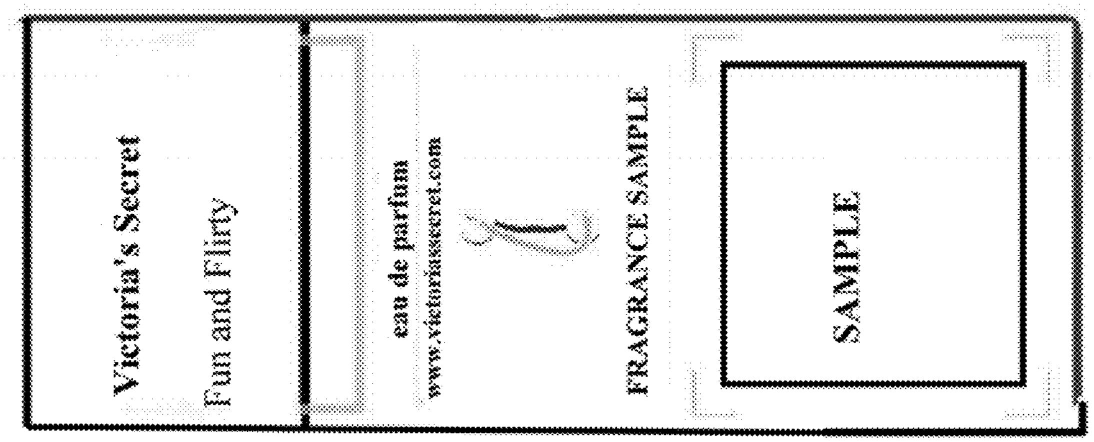
Figure 21C:
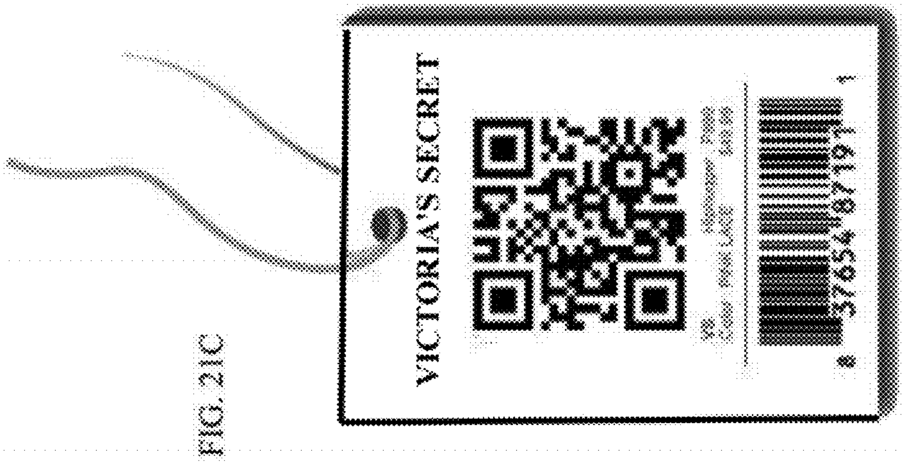

FIG. 21A-C: A promotional or cross-promotional hang tag, tag or label of the invention (e.g., but not limited to, JetScents® product) (FIG. 21A) with sealed printed fragrance sample or removable fragrance wipe, or any removable sealed fragrance, personal care product, or food or beverage, sample inside (FIG. 21B), with product information on back of hang tag, bar code, with any smart phone scan-able interactive quick response internet URL embedded code, in this case a quick response (QR) code (FIG. 21C).

FIG. 22A-B: Shows how consumers can scan bar code or interactive quick response QR-code (FIG. 22A) on a promotional or cross-promotional tag or label of the invention (e.g., but not limited to, JetScents® product) with smart phones (FIG. 22B) or other similar scanning electronic device, which automatically loads and directs smart phone to website URL address of fragrance manufacturer, coupons, contests, or special promotions, and the like.

Figure 23A:
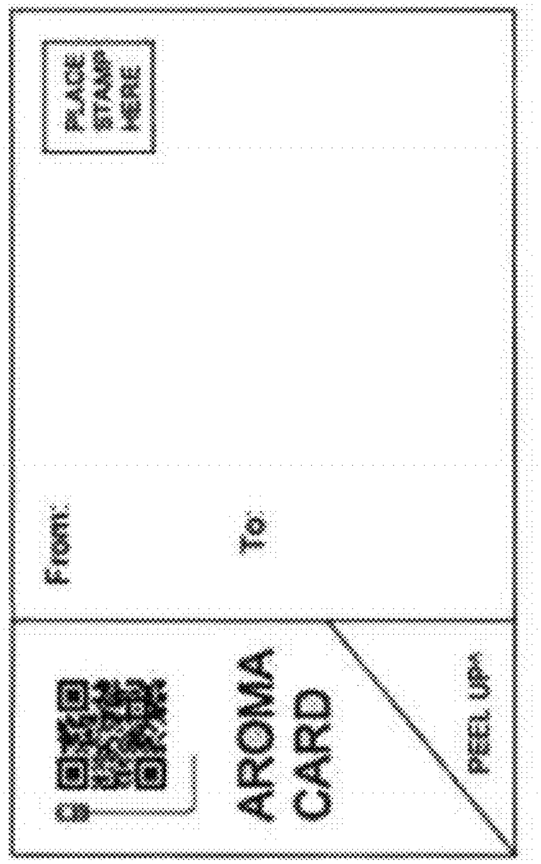
Figure 23B:
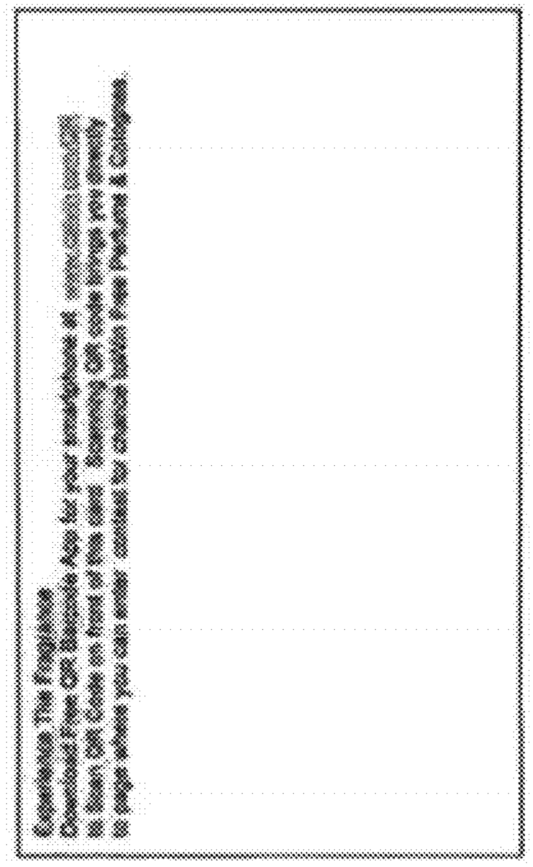

FIG. 23A-B: Shows post card version of printed, peel up fragrance sample of a promotional or cross-promotional tag or label of the invention (e.g., but not limited to, JetScents® product). Postcard with fragrance wipe affixed to postcard with glue is also claimed in this figure (FIG. 23A-B, front and back views).

Figure 24A:
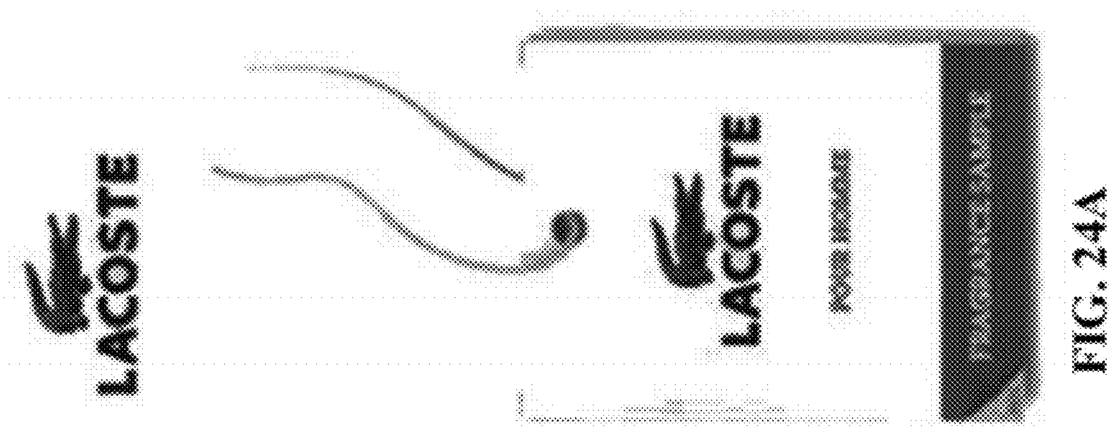
Figure 24B:
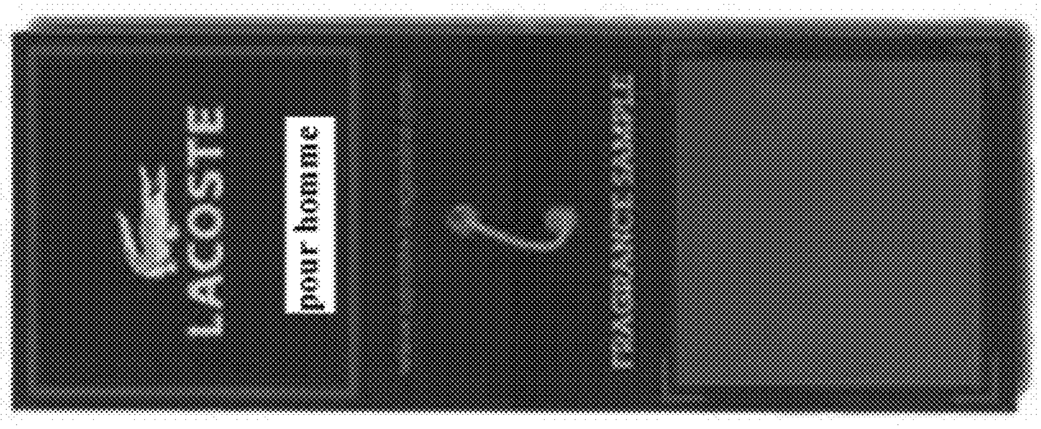
Figure 24C:
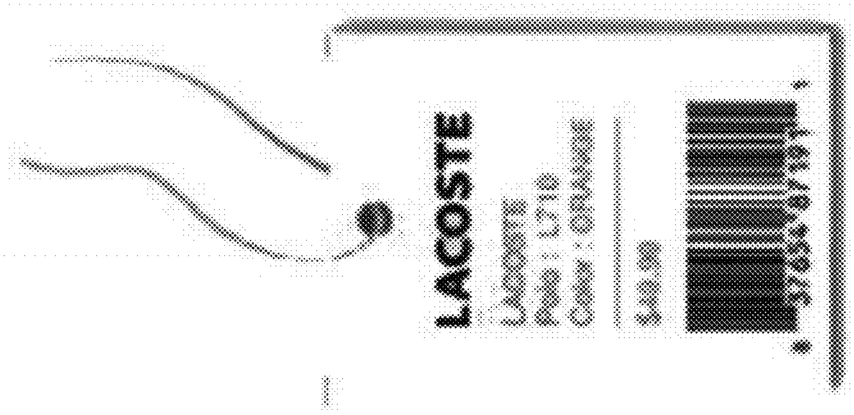

FIG. 24A-C: Lacoste Branded sample of a promotional or cross-promotional hang tag, tag or label of the invention (e.g., but not limited to, JetScents® product) (FIG. 24A) with printed fragrance sample (FIG. 24B) with interactive smart phone scan-able bar code or interactive quick response QR code (FIG. 24C) for directing consumer to websites, special promotions, and sweepstakes.

Figure 24D:
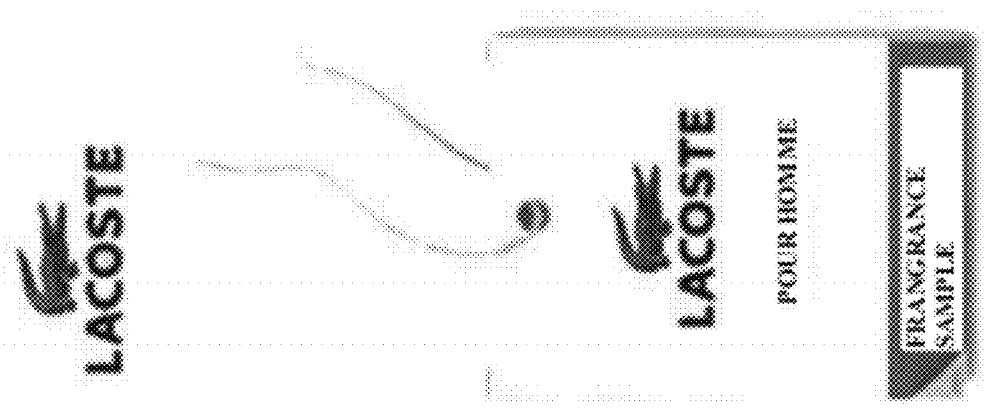
Figure 24E:
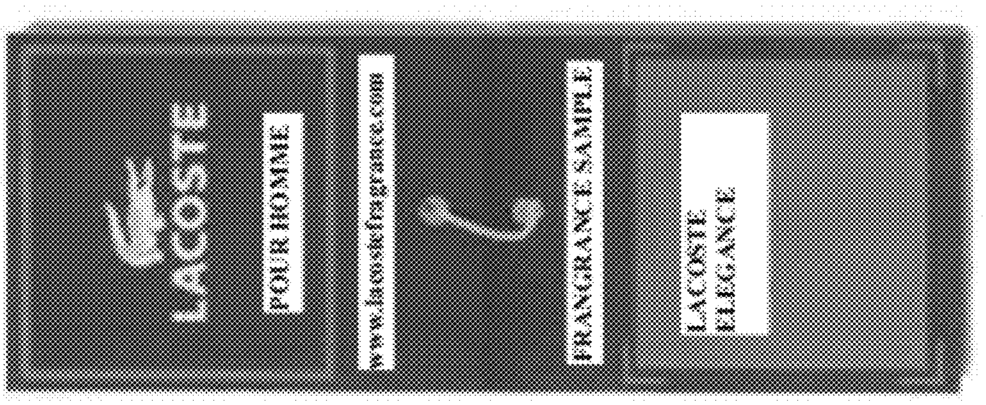
Figure 24F:
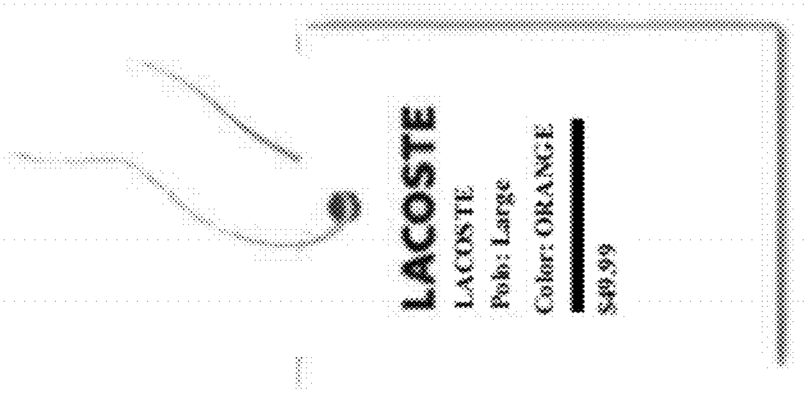

FIG. 24D-F: Lacoste Branded sample of A promotional or cross-promotional hang tag, tag or label of the invention (e.g., but not limited to, JetScents® product) (FIG. 24D) with printed fragrance sample (FIG. 24E), and product information such as style, color, price, website information (FIG. 24F).

Figures 25A, 25B, 25C:

FIG. 25A-C: Lacoste Branded sample of A promotional or cross-promotional hang tag, tag or label of the invention (e.g., but not limited to, JetScents® product) (FIG. 25A) with removable fragrance wipe or pad sample affixed inside with glue (FIG. 25B-C).

Figures 26A, 26B, 26C:
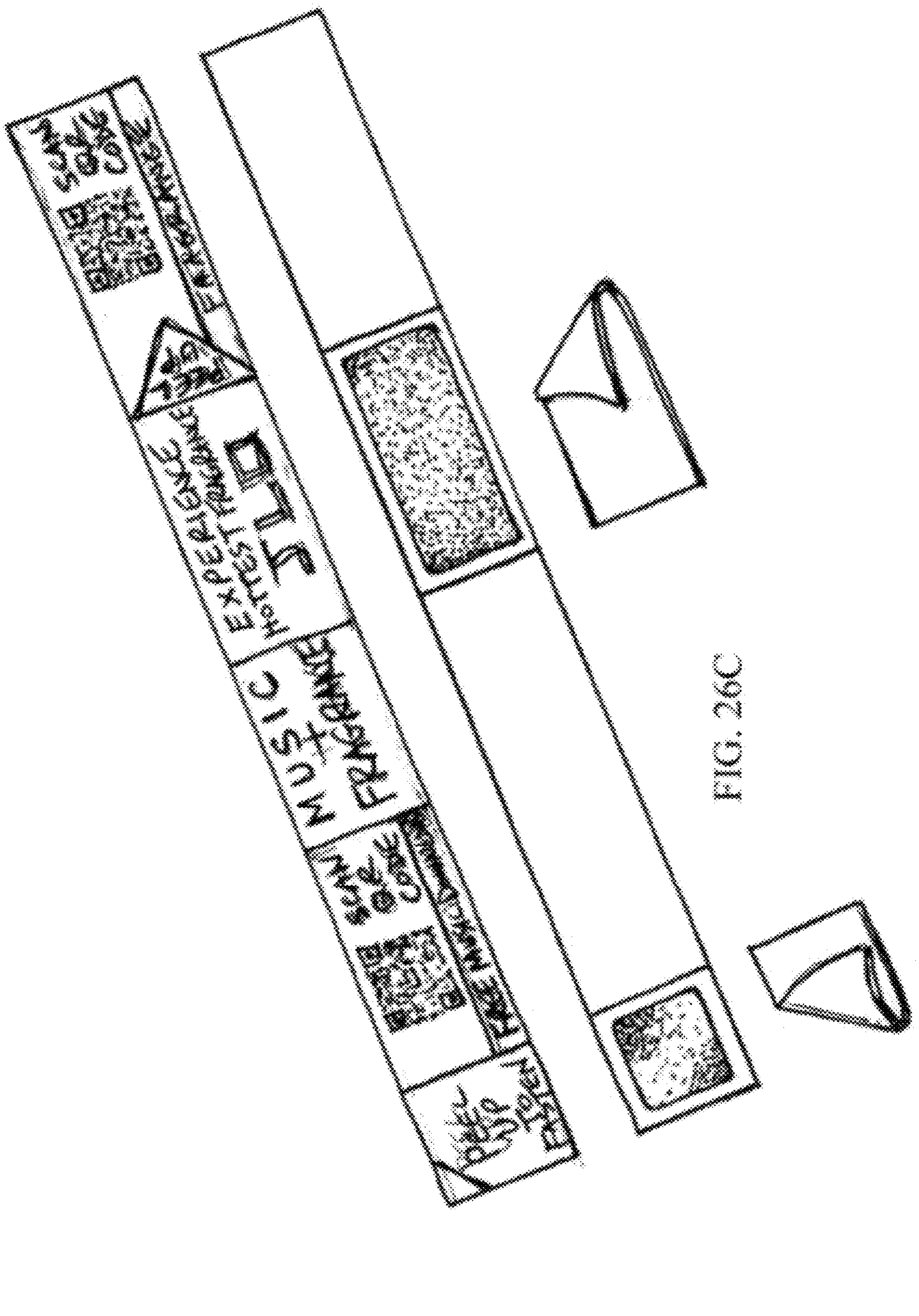

FIG. 26A-C: A promotional or cross-promotional hang tag, tag or label of the invention (e.g., but not limited to, JetScents® product) Designer Fragrance premium incentive promotional wrist hang tag made out of paper, plastic, natural or synthetic materials, with printed decorative design, fragrance infused ink zone with peel up label to retain freshness of fragrance, optional fragrance pad packet, pouch, or vile adhered to bracelet, and integral interactive QR Quick Response code or any similar smart phone scan-able code that can direct smart phone user to specific internet URL offering special promotions, video downloads, music downloads, contests, sweepstakes, or additional cross-marketing social media opportunities.

Figure 27B:
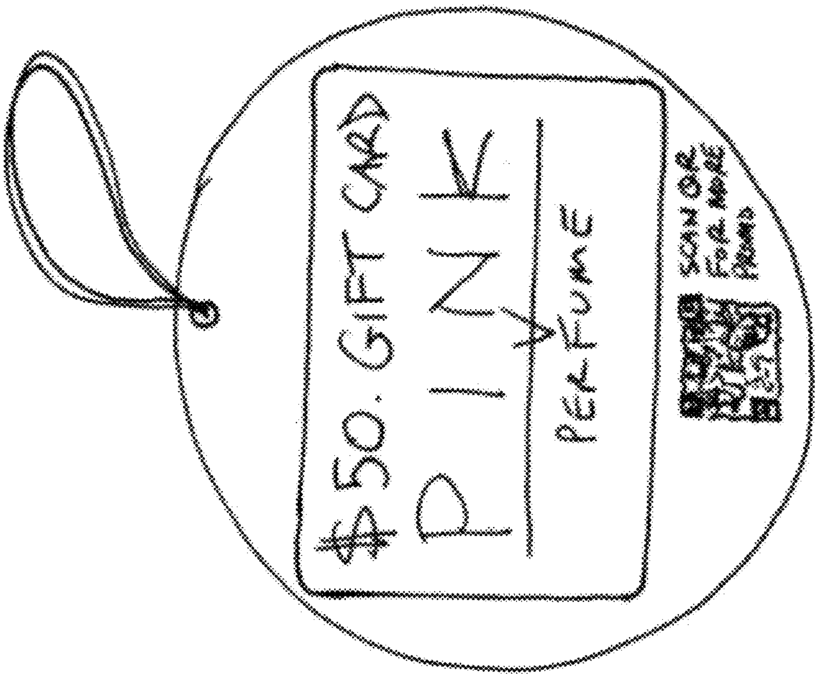
Figure 27A:
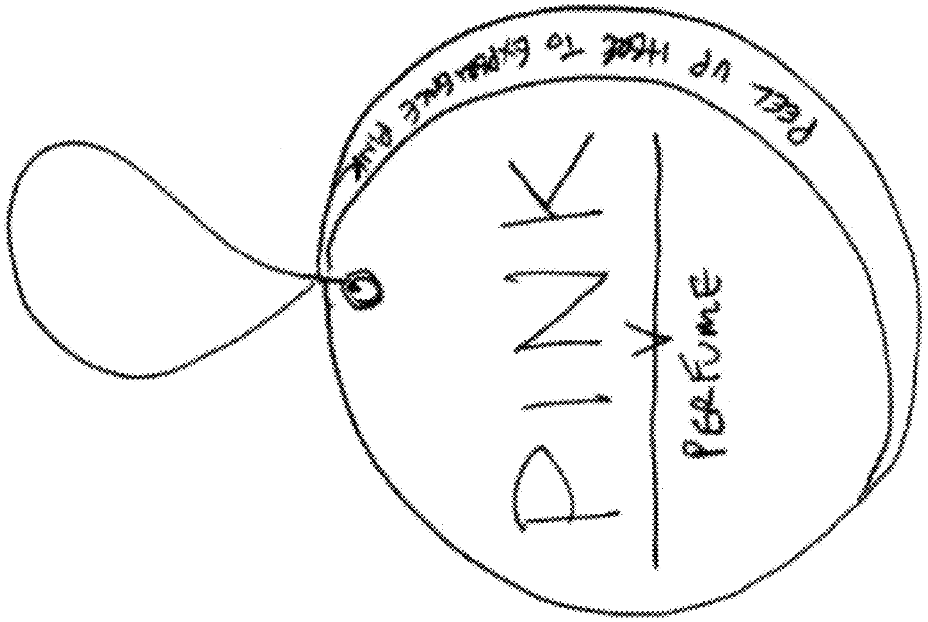

FIG. 27A-B: A promotional or cross-promotional hang tag, tag or label of the invention (e.g., but not limited to, JetScents® product) Designer Fragrance 2D holiday ornament gift card hang tag with peel up fragrance ink sample, fragrance single use packet (not shown), or paper infused fragrance sample (FIG. 27A, Front; FIG. 27B, Back) with contest, or ornament hang tag with adhered gift card. Designer Fragrance 2D holiday ornament gift card has interactive Quick Response internet QR code or similar interactive URL embedded code, website code, or bar code that can be scanned by smart phones or retail scanners as gift card, or sold solely as 2D Designer Fragrance holiday ornaments with interactive quick response QR or any similar type internet URL scanable codes, shaped like Christmas, Chanukah, Valantine's Day decorations [sphere, wreath, Santa Clause, Jewish Star, Draydel, Heart, and the like. Sold in single packages or packages with multiple units. This is a unique interactive holiday ornament invention, provides a fragrance olfactory experience and internet brand engagement experience with quick response internet codes that can be scanned to direct consumers to online holiday music, contests, sweepstakes, and special promotions. QR interactive hang tag 2D holiday ornaments may also be sold without fragrance, or designed in other non-holiday themes such as birthdays, get well, anniversary, etc.

Figure 28:
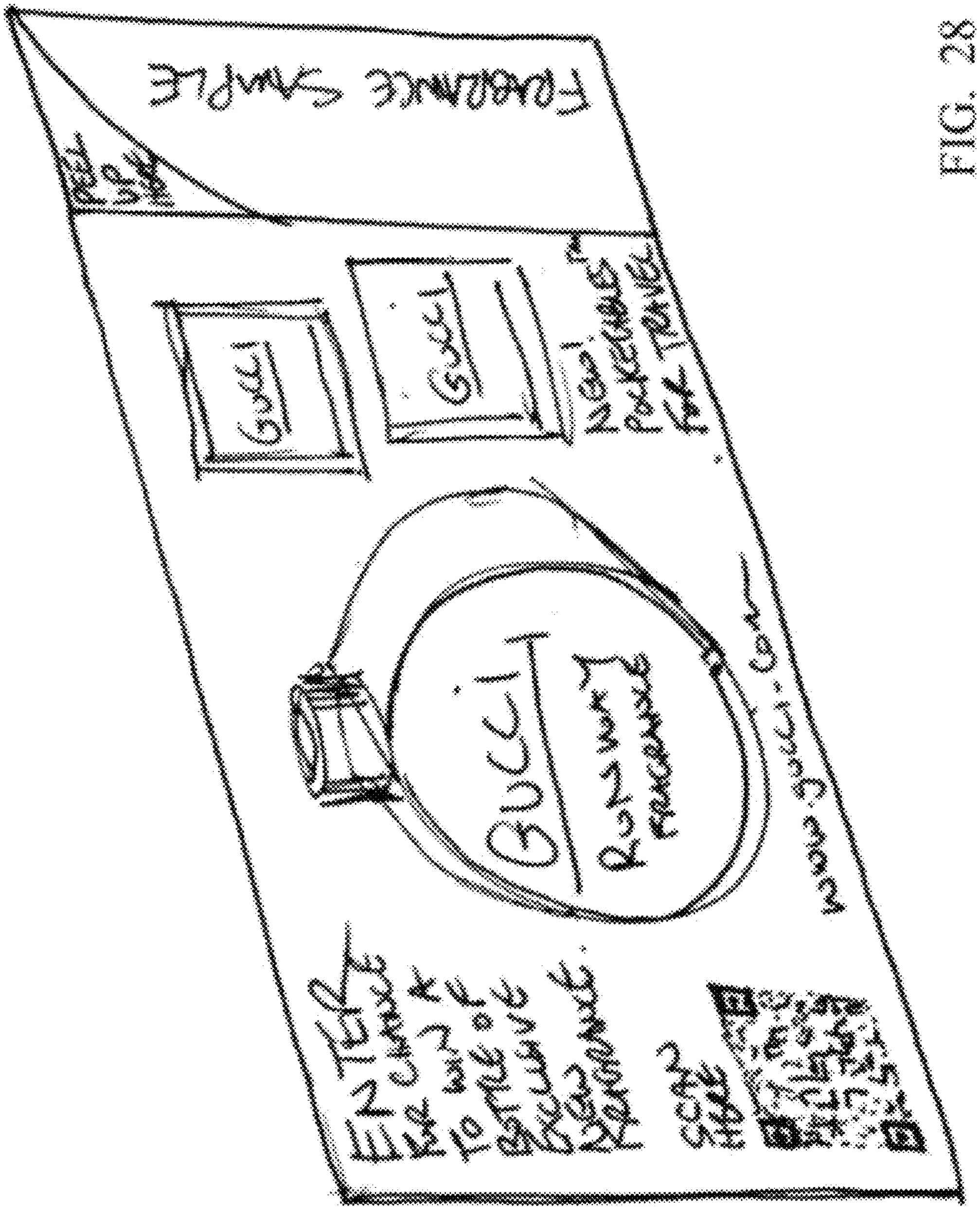

FIG. 28: A promotional or cross-promotional tag or label of the invention (e.g., but not limited to, JetScents® product) Designer Fragrance Bang Tail Credit Card Mailer. Bang tail can have either peel up designer fragrance scent sample, or single-use Designer Fragrance wipe or pad affixed to the paper tag. Additional interactive features include coupon, or internet QR Quick response scan-able smart phone code for special promotions, contests, sweepstakes, to engage consumers with fragrance manufacturer's website to promote sales of fragrances.

Figure 29B:
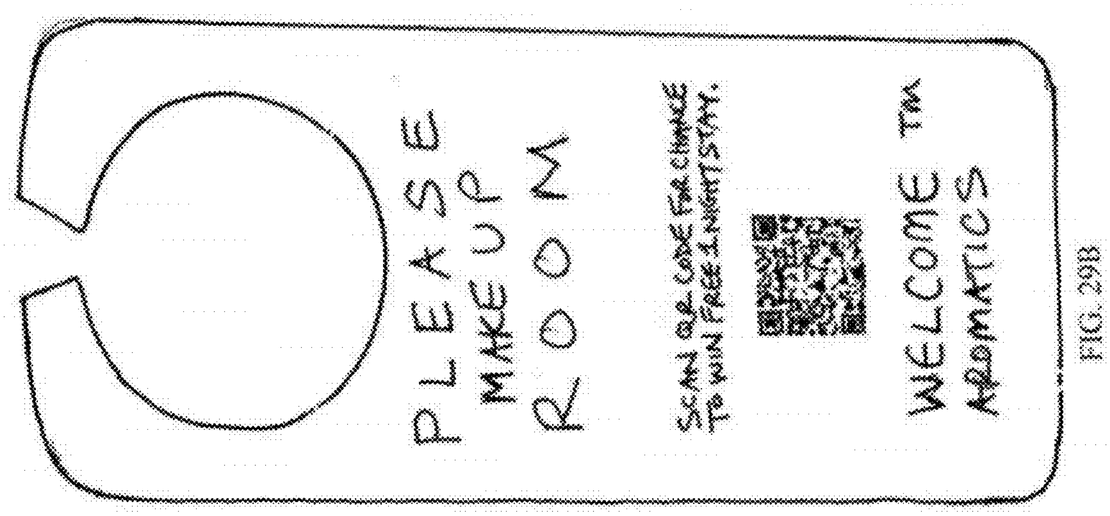
Figure 29A:
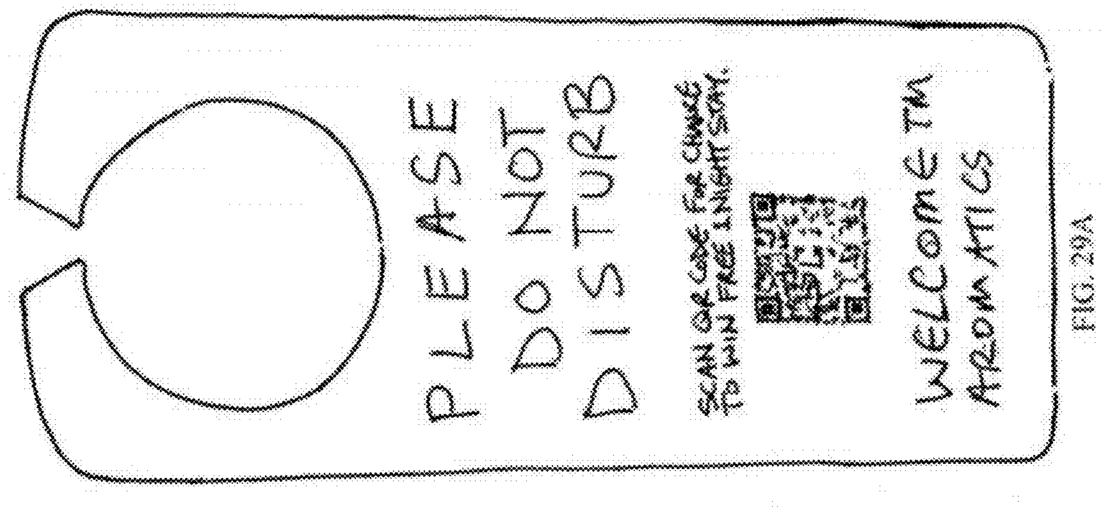

FIG. 29A-B: A promotional or cross-promotional hang tag, tag or label of the invention (e.g., but not limited to, JetScents® product) Designer Fragrance door hanger air freshener hang tags for hospitality and home use. These Designer Fragrance door hang tags have hospitality message on both sides of the hang tag (e.g., Welcome, Your Home Away From Home, Do Not Disturb (FIG. 29A), Please Make Up Room (FIG. 29B)), and cross-promotion for Designer Fragrance on bottom of hang tag with interactive internet QR Quick Response code, and Designer Fragrance infused inks that are sealed with peel off protective label or just printed or infused on hang tag cardstock and sold in bulk, sealed in airtight container for easy distribution by housekeeping. A promotional or cross-promotional hang tag or label of the invention (e.g., but not limited to, JetScents® product) Designer Fragrance door hanger air freshener tags ensure that the guests are greeting with a pleasant aroma before entering or leaving their room, such as lemons, pine, orange, cookies, baked apple pie etc. One additional variation is a Therapeutic Fragrance door hanger model that uses lemons and limes, or infused delimonene organic chemistry to diffuse a citrus scent that is proven to enhance breathing by opening up bronchial tubes to ease breathing in asthmatics and allergy sufferers. There are currently no hospitality, home, or commercial paper door hanger air fresheners on the market, or aromatic door hangers with interactive quick response URL codes. This is a unique new invention.

Figure 30B:
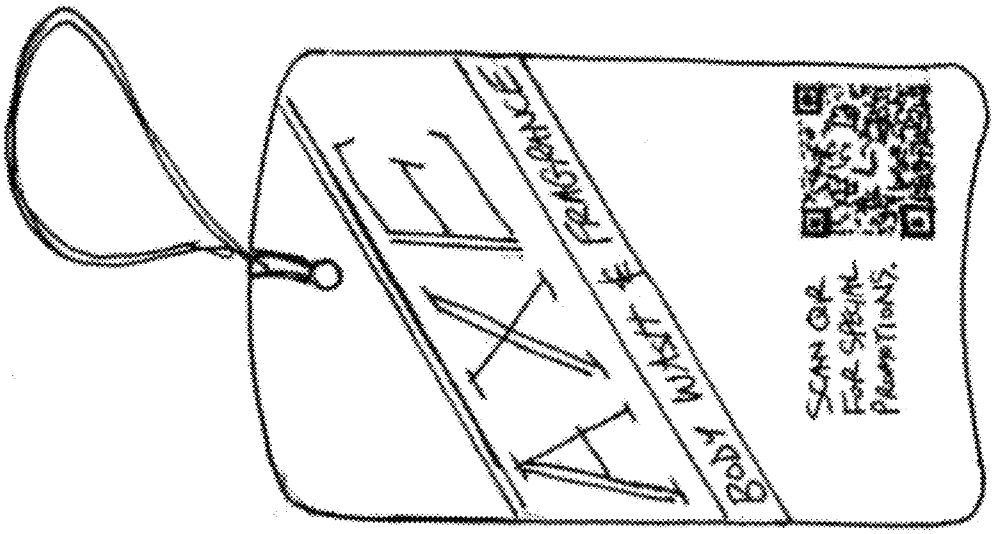
Figure 30A:
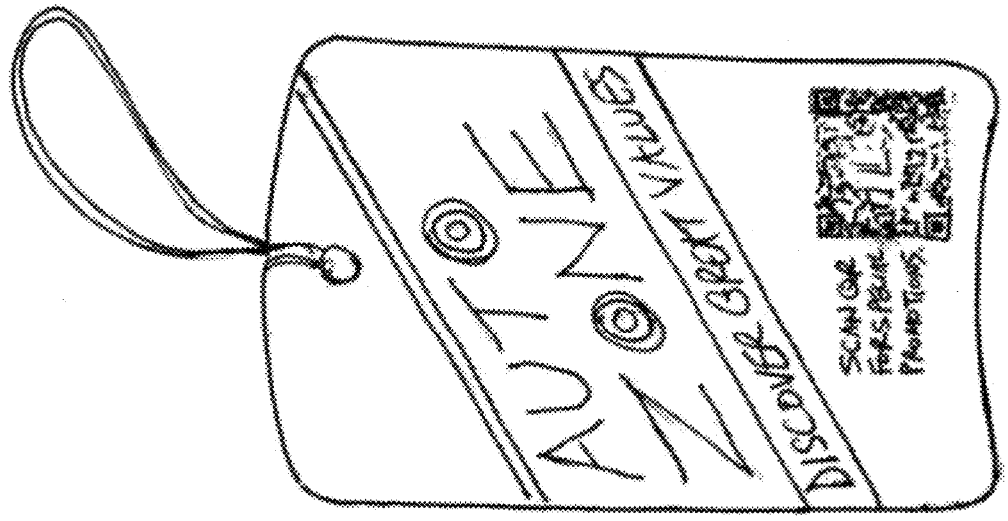

FIG. 30A-B: A promotional or cross-promotional tag or label of the invention (e.g., but not limited to, JetScents® product) Interactive Designer Fragrance automotive hang tag for freshening an automobile interior with a Designer Fragrance, whereby the hang tag promotes an automotive retailer (FIG. 30A) or one product on one side, and the fragrance brand on the other (FIG. 30B). The additional functionality of the interactive URL embedded internet QR code or any other type of smart phone scan-able code allows marketers to deliver special promotions, coupons, store locations, contests, and sweepstakes or information directly to consumers when they scan a promotional or cross-promotional hang tag, tag or label of the invention (e.g., but not limited to, JetScents® product) Interactive Designer Fragrance automotive hang can deliver promotions to any smart phone. This is a unique new invention not available in the market.

Figure 31B:
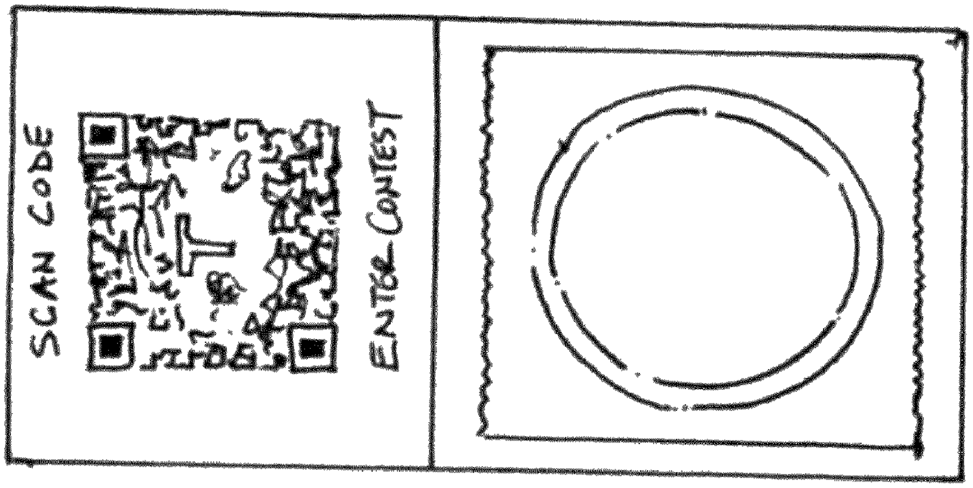
Figure 31A:
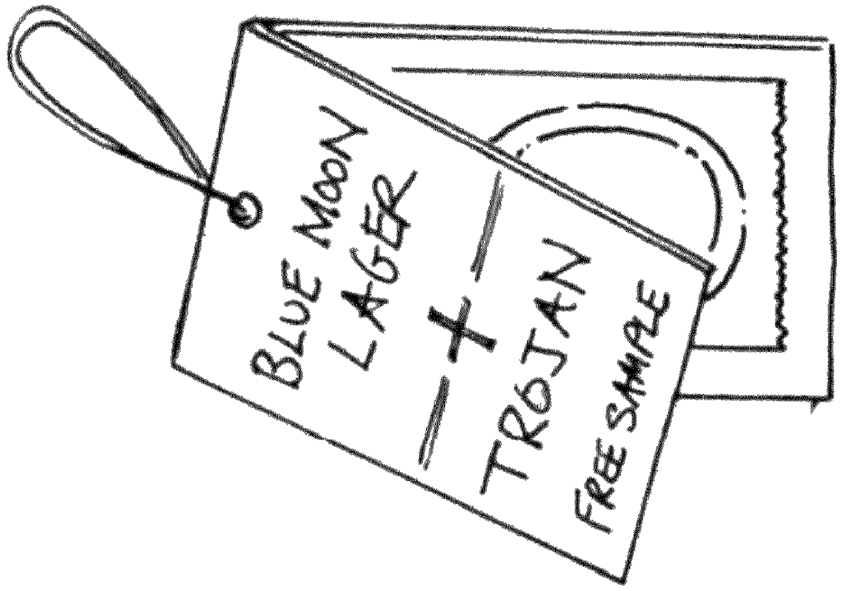

FIG. 31A-B: Illustration of a promotional or cross-promotional hang tag, tag or label of the invention (e.g., but not limited to, JetScents® product) cross-promoting a product and condoms (FIG. 31A), or cross-promoting a fragrance, condoms, and interactive internet QR code on a single hang tag (FIG. 31B).

FIG. 32. Chart showing how product retailers, internet companies, or manufacturers can track and analyze consumers use and resulting sales of products or cross promoted products using scans of interactive quick response QR-codes on a promotional hang tag, tag, or label of the invention (e.g., but not limited to, JetScents® product) for tracking consumer scan data, which can include one or more of product category, store location, time of purchase or scan, SKU number, sales representative ID, and number of scans by consumer with smart phones or other similar scanning electronic device.

Figure 33A:
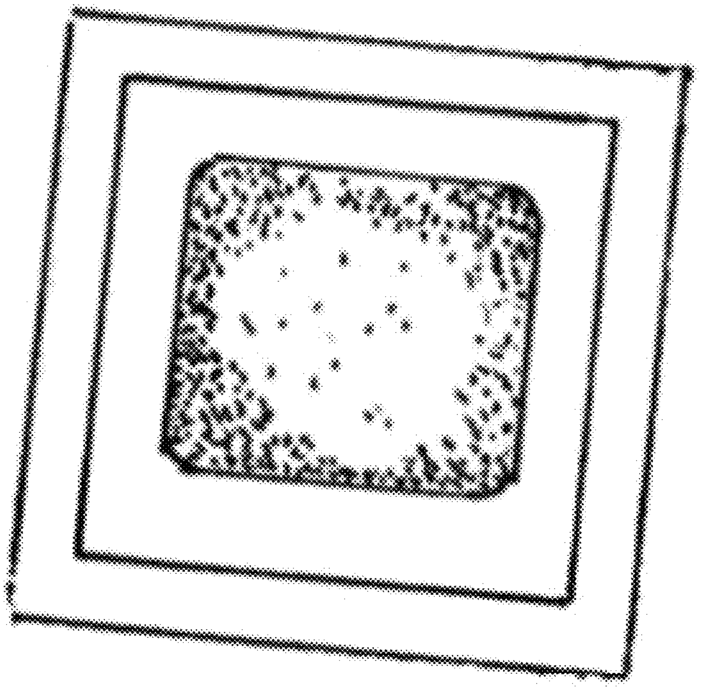
Figure 33B:
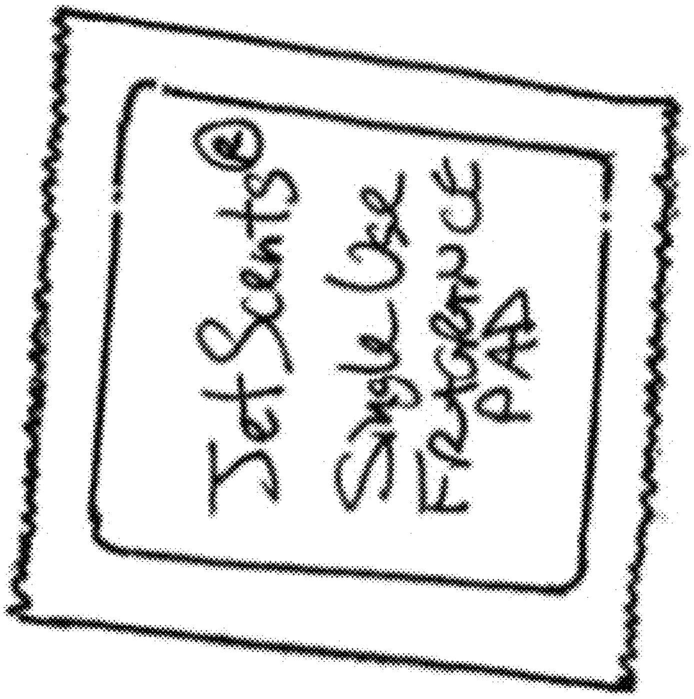

FIG. 33A-B: Illustration of a promotional or cross-promotional label of the invention (e.g., but not limited to, JetScents® product) cross-promoting a fragrance or other product wipe packet and interactive internet QR code on a single hang tag (FIG. 33A-B).

DESCRIPTION

The present invention relates to and provides methods and promotional hang tags, tags or labels with associated product samples combined with interactive quick response or scan-able codes linked to a specific internet Uniform (or Universal) Resource Locator (URL, for providing contact information, promotional or cross promotional product samples or products and related marketing information regarding product promotional or cross-promotional features, where the tag or label carries a scan-able or QR promotion code and an integral product sample, such as, but not limited to, a fragrance, a personal care product, a healthcare product, a food or beverage product, an entertainment product, a toy, a gift card, a book, an e-book, software, a website access code, an office supply product, a school supply product, a travel size product, a consumer electronics product, a health and wellness product, a medicine sample, a health and beauty product, or an educational product, sample or product for promotional purposes. The invention can replace "inactive brand tag" with an "interactive" promotional or cross promotional tag or label that has product or cross promoted product or product sample with marketing information or price on it, with additional product sample functionality, that delivers a second "brand experience" of a sample product to the consumer, as well as a third "brand experience" of a QR code or other scan-able code that links to an internet URL to provide further promotional or cross promotional features, such as, but not limited to downloadable media, promotional or cross promotional company or product websites, retail outlets, or sales representatives, products, gifts, rebates, coupons or coupon codes, discounts, sweepstakes, contests, auctions, and the like, as non-limiting examples.

The interactive QR codes, MS-Tags, and any other URL interactive code format is that these URL internet connecting "interactive codes" allow smart phone users or users of any computing device with optical scanner element to scan the code and be linked to both static data that is typically hosted by bar codes, and or specific internet URL's that can host much broader band width of data that includes text, multiple languages, audio, video, special promotions, coupons, testimonals, product specifications, MSDS documents, certifications, product demonstrations, dealer locations, retail locations, image galleries, GPS coordinates, warranty product registration forms, opt-in interactive forms.

The present invention further provides uses of internet URL QR codes or similar scan-able codes (as well known in the art, e.g., US patent/application publication nos: U.S. Pat. No. 6,637,662, US20080309976, U.S. Pat. No. 6,494,375, entirely incorporated herein by reference) associated with a promotional or cross promotional product or product sample, where the QR or similar code links to a promotional or cross promotional internet URL, wherein:

a) QR (quick response) internet URL codes or similar internet URL codes can be used in or on any product, packaging, or single use packaged product or product sample for sale, or use as premium incentive give away, to include but not limited to product or product sample provided in or as one or more of: printed areas, sheets, wipes, vials, pouches, packets, patches, containers, pads packets, pouches, boxes, containers, mini-aerosols, aerosols, sprays, and the like. The product or product sample can be in the form or one or more of a fragrance, an apparel or garment product, a personal care product, a healthcare product, a food or beverage product, an entertainment product, a toy, a gift card, a book, an e-book, software, a website access code, an office supply product, a school supply product, a travel size product, an inhaler, a consumer electronics product, a health and wellness product, a health and beauty product, a sporting goods product, or an educational product; and/or b) QR (quick response) or similar scan-able URL codes can be printed directly on products, printed on labels, printed on tags, molded in, embossed in, or hot stamped in, or be used for promotional or cross promotional commercially sold goods such as, but not limited to fashion accessories with interactive QR-code features, to include products, brochures, coupons, packaging, belts, necklaces, bracelets, earrings, shoes, boots, sandles, tags, hang tags, website promotions, videos, books: apparel and garments with interactive QR-code features, including but not limited to shirts, pants, jeans, dresses, blouses, hats, scarves, swim wear, jackets, sweaters, lingerie, underwear, robes, ties, packaging, hangers and hanger covers, protective bags, labels, tags, hang tags, catalogs, brochures, coupons, gift cards: food packaging with interactive QR-code features, to include products, boxes, and single use or travel size packaging of food: beverage packaging with interactive QR-code features, to include and single use or travel size beverage packaging to include boxes, cartons, bottles, cans, and pouches: health and beauty packaging with interactive QR-code features, to include, containers, bottles, vials and single use or travel size bottles, inhalers, tubes, packets, pouches, wipes, pads, gels, creams, powders, eye liners, nail polish, hair dye, temporary tattoo decals, nail art, catalogs, coupons; consumer electronic products with interactive QR-code features, to include to product, packaging, boxes, manuals, catalogs, labels, tags: major home appliances with interactive QR-code features, to include to product, packaging, boxes, manuals, catalogs, brochures, labels, tags: sporting goods with interactive QR-code features, to include to product, apparel including shirts and jackets and pants and hats and scarves and tee shirts and high performance shirts, outdoor goods, weapons, extreme sports gear, skiis, snowboards, tennis products, baseball products, soccer products, swim wear, running gear and apparel, replenishable products, packaging, boxes, manuals brochures, labels, tags: automotive, truck, RV, marine, ATV, snowmobile, scooter, or motorcycle products, accessories or care products (e.g., helmets, gloves, protective gear, branded apparel or footwear, detailing, interior or exterior accessories, cleaning and painting products, and the like) with interactive QR-code features, to include to product, packaging, boxes, manuals, brochures, catalogs, warrantees, labels, tags, personal care packaging with interactive QR-code features, to include to include any package, brochures, catalogs, or container type or single use or travel size packaging including bottles, tubes, pouches, wipes, pads, boxes, pencils, gels, powders, creams; medicine packaging with interactive QR-code features, to include, brochures, containers, tubes, bottles, blister packs, and single use or travel size bottles, tubes, packets, pouches, wipes, pads, gels, powders, pills, liquids, powders: Toys products and packaging with interactive QR-code features, to include to boxes, manuals, brochures, board games, action figures, dolls, science games, IQ games, product or product sample, labels, tags, tubes, posters, websites with scan-able interactive QR-codes; Licensed Brand Products and packaging with interactive QR-code features, to include to include boxes, manuals, brochures, product or product sample labels, tags, products, tubes, posters, websites with scan-able interactive QR-codes; Gift Cards and Gift Card Packages with interactive QR code features, to include downloadable audio and video media, promotions, testimonials, coupons; e-Books with interactive QR code features to include, Digital audio books, and digital text books to include e-book packaging, e-book gift cards and gift card packages with interactive QR-code features, to include downloadable e-book samples via QR-codes on packaging or accessed via websites; Books with interactive QR code features, to include printed books with scan-able interactive QR-code URL's, QR-codes printed on book jackets, QR-codes printed on book pages offering a new and unique interactive feature that delivers additional audio and video content, QR-codes on packaging and labels, Software packages with interactive QR-code features, to include downloadable product demonstrations in audio and video formats; Sight Impaired Products and Packaging with interactive QR-code features, to include product packages and printable content whereby QR-codes can be printed next to braille or printed text words, or just be printed, and whereby a blind or sight impaired user can use their smart phone to scan the product package to get an instant audio or video synopsis of the product.

The present invention relates to methods and promotional tags and/or labels with product samples or products of fragrance, personal care products, or foods or beverages, combined with interactive quick response (QR) or scan-able codes linked to internet URL or contact information, for providing promotional or cross promotional product samples or products and information regarding product promotional or cross-promotional features such as, but not limited to, sweepstakes, contests, coupons, music downloads, pricing, and manufacturing thereto, and more particularly to a tag (e.g., hang-tag) that carries a scan-able promotion code and an integral fragrance, personal care product, or food or beverage, sample for promotional purposes. The invention replaces "inactive brand tag" with an "interactive" promotional or cross promotional tag that has product or cross promoted product information or price on it, with additional fragrance, personal care product or food or beverage, sample functionality, that delivers second "brand experience" of a fragrance to the consumer, and third "brand experience" of an interactive web based sweepstakes, contest, or download or access via web address, bar code, QR-code, MS TAG, or any other scan-able interactive URL internet code, as non-limiting examples.

The promotional or cross promotional product sample product or product can include one or more of any suitable product sample, in the form of a solid, a liquid, a gel, an aerosol, a spray, a powder, a pill, a composition, a freeze-dried product, a dehydrated product, a desiccated product, a compound, electronics, recordable memory, or any combination thereof, which provides any promotional or cross-promotional function.

In an embodiment, the invention relates to a mechanical design of a promotional or cross-promotional tag or label of the invention (e.g., but not limited to, JetScents® product) to include one or more of 7 distinct functions: 1) Display brand name, 2) display brand website and contact information, 3) display primary product model number, price, 4) display scan-able barcode, 5) Display smart phone scan-able quick response internet QR-code or any other scan-able code for linking the consumer directly to the manufacturers website or any singular URL on the internet, 6) hold fragrance, personal care product, or food or beverage, sample via sheet, wipe, vial, pouch, packet, patch, gel, or pad, 7) have die cut hole for affixing cord, lanyard, wire, swift tack fastener, safety pin, adhesive back, as a means to affix the JetScent® tag to clothing, products, cans, bottles, or lanyard necklace for sales and promotional purposes. (see, e.g., FIGS. 1-4.)

In an embodiment, the invention relates to a promotional or cross-promotional tag or label of the invention (e.g., but not limited to, JetScents® product), printed area, sheet, wipe, vial, pouch, packet, patch, container, or pad, bracelet, postcard, or the like, that combines sample delivery system with product brand name, logo, pricing, size, website, model identifiers, bar codes, scan-able internet URL codes, MS-TAG, or scan-able URL Quick Response QR-codes, scan-able with any internet enabled scanning device including but not limited to smart phones, computers, netbooks, laptops, internet tablets.

A promotional or cross-promotional tag or label of the invention (e.g., but not limited to, JetScents® product) can be hung or affixed to, but is not limited to, clothing products, fragrance products, apparel and garments, fashion accessories, health & beauty products, music CD jewel cases, toys, sporting goods, alcoholic beverage cans/bottles, non-alcoholic, cans/bottles, tobacco products, automotive and motorcycle products, medical products, and the like, by "swift tack" (i.e., a lopped plastic fastener applied by a gun), fiber/plastic/wire cord, adhesive, safety pin, and any other fastener or fastening means, can include either integral one-time use product sample in the form of printed area, sheet, wipe, vial, pouch, packet, patch, container, or pad sample for promotional purposes.

In another embodiment, the invention relates to an integral single use printed area, sheet, wipe, vial, pouch, packet, patch, container, or pad sample that can be manufactured from paper, synthetic wipe, plastic, polymer, glass, woven or porous material, or metal, foil, or printed ink, or any combination thereof. The promotional or cross-promotional tag or label of the invention (e.g., but not limited to, JetScents® product) allows retailers to inexpensively disseminate samples of promotional or cross-promotional products on, e.g., but not limited to, garments, boxes, bottles, accessories, toys, direct mail promotions, and gift cards. The unique promotional tag allows consumers to experience the sample brand, and in the case of the one-time use sample printed area, sheet, wipe, vial, pouch, packet, patch, container, or pad, allows the consumer to apply the actual sample on clothing or skin, or to taste, to fully enjoy the benefits of the actual product. A promotional or cross-promotional hang tag, tag or label of the invention (e.g., but not limited to, JetScents® product) adds a unique new sales promotion opportunity and method for enhancing sales in a product category, can replace bar code tags or substantially impart new interactive promotional features to hang tags used by numerous retailers, can cross-promote products and brands, and enable disseminate more than one single promotional offer. Additional functions of the interactive quick response internet QR-code product sample tag include instant delivery of, e.g., but not limited to, coupons, sweepstakes, contests, videos, and special promotions, to any web enabled device with camera feature, such as but not limited to smart phones, laptops, computers, scanners, netbooks, and computer tablets.

No other promotional tag exists today that has a 5-in-1 functionality, of one or more of 1) a visual brand informational placard, 2) a scan-able barcode 3) Interactive Quick Response QR/MS Tag or any other smartphone scan-able code that can be photographed by smartphones and link the consumer instantly and directly to a specific internet URL for promotions, contests, coupons, videos 4) QR-Code or any other scan-able interactive code that can be scanned by smart phone users to instantly link them to an internet URL where they can download free song 5) functioning product GWP gift with purchase that excites the olfactory or other senses and/or has a detachable single—use sample, printed area, sheet, wipe, vial, pouch, packet, patch, container, or pad, fragrance, consumer product or food or beverage sample that can be used by customers to experience the brand and motivate the consumer to make an additional purchase of products from the manufacturer via their website or at retail store.

The promotional tag comprising a scan-able internet URL code and sample in an associated printed area, sheet, wipe, vial, pouch, packet, patch, container, or pad, can be manufactured for minimal cost, and combines the existing attributes of a product hang-tag with the "interactive product brand experience" of a product sample delivery system, music, video delivery system, and information delivery system in one simple-to-manufacture promotional or cross-promotional tag or label of the invention (e.g., but not limited to, JetScent® product).

A printed promotional or cross-promotional tag or label of the invention (e.g., but not limited to, JetScent® product) is comprised of a coated paper or plastic stock that can be imprinted with a fragrance sample provided in an associated printed area. The hard coated paper stock or plastic creates and air barrier that is impervious to releasing or admitting air that would evaporate or degrade samples found in the printed area. First the fragrance laced ink sample is printed in any desired shape on the hard coated paper stock or plastic, then the paper or plastic stock can be printed with a separate continuous ringed shape of adhesive. The paper or plastic stock then receives a die cut of the hang-tag hole, a score line is applied at the mid-point for folding, and a promotional or cross-promotional tag or label of the invention (e.g., but not limited to, JetScents® product) outer shape is die cut out of the main paper roll. At this time, the paper stock blanks are folded in half, back onto itself, whereby the continuous ring of adhesive forms an airtight seal around the fragrance sample imbedded inside. The printed promotional or cross-promotional tag or label of the invention (e.g., but not limited to, JetScents® product) can have a graphic label that includes all brand information and promotions, along with a demarcation alerting consumer to peel back or open the fragrance sample provided in a printed area associated with or provided with or attached to a promotional or cross-promotional tag or label of the invention to experience the brands fragrance. A promotional or cross-promotional tag or label of the invention (e.g., but not limited to, JetScents® product) can be manufactured without a die-cut hang-tag hole, and can be manufactured with an adhesive back for applying to any product surface, including, but not limited to, boxes, music jewel cases, bottles, cans, car windows, car mirrors, wholesale and retail gift cards. The printed promotional or cross-promotional tag or label of the invention fragrance process can also be used to manufacture promotional sample interactive wrist tags with any scan-able internet quick response URL codes, including but not limited to MS Tags or QR-codes, and can be mailed or handed out as premium samples at any event, including but not limited to retail, fashion, sporting, and entertainment events. The promotional or cross-promotional tag or label of the invention comprising a sealed or contained product sample and QR Quick Response internet URL codes can also be used to manufacture inexpensive promotional sample hang tags, gift cards, postcards, and hang tags that can be hung on walls.

The printed promotional or cross-promotional tag or label of the invention or bracelets can be marketed as a multi-pack of single sample type, or an assortment of multiple sample types that can be packaged in a single or multiple boxes, and offered as either a premium incentive, or sold as a boxed sample assortment. The package can include any of the following, printed promotional or cross-promotional tag or label of the invention for home, or auto use, tag associated bracelets, earrings, and special promotions such as coupons or limited time purchase offers, contests, sweepstakes etc. The promotional or cross-promotional tag or label of the invention can be manufactured with or without any type of interactive scan-able URL internet code, or QR Quick Response internet URL code, and will still be afforded protection by the integral fragrance and sampling claims of this invention application.

The one-time-use promotional or cross-promotional tag or label of the invention is comprised of a "sample printed area, sheet, wipe, vial, pouch, packet, patch, container, or pad " that is sealed or contained, which can optionally be comprised of a printable paper or foil outer layer laminated to a metal foil interior layer, creating an airtight packet that contains at least one printed area, sheet, wipe, vial, pouch, packet, patch, container, or pad comprising at least one of a fragrance, personal care product, or food or beverage, sample. The "sample printed area, sheet, wipe, vial, pouch, packet, patch, container, or pad " packet can be affixed with an adhesive to the inside or front surface of any paper, metal, plastic, wire, glass, or any synthetic material, including but not limited to any product surface such as, but not limited to, boxes, music jewel cases, bottles, cans, car windows, car mirrors, wholesale and retail gift cards, and as promotional premium in the form of packet, promotional necklace, promotional keychain, promotional bracelet.

The present invention can provide one or more of the following non-limiting embodiments, as described herein and/or as well known in the art:

A product of the invention as a unique combination of a brand hang tag and fragrance sample, printed onto the tag material, such as paper, plastic, foil, foil coated paper, allowing for consumer to peel back "protective seal cover" of the tag to experience the fragrance, personal care product or food or beverage sample. (see, e.g., FIG. 5 Single Fragrance) (FIG. 20 Multiple Fragrances)

A product of the invention as a unique combination of a brand tag and fragrance, personal care product or food or beverage sample, whereby a fragrance, personal care product or food or beverage wipe or pad packet is affixed to hang tag with glue or gummy material, allowing for it's removal and one-time use to experience the product or full fragrance aroma on the consumer's body or clothing. (see, e.g., FIGS. 1-4.)

A product of the invention as a unique combination of a brand tag and fragrance, personal care product or food or beverage sample, whereby a fragrance, personal care product glass vile is affixed to the Fragrance Tag via pop-up die cuts in the material, allowing for it's removal and multiple uses to experience the sample on the consumer's body or clothing. (see, e.g., FIG. 18.)

A product of the invention as a unique combination of a brand tag and fragrance, or personal care product, whereby a fragrance or personal care product in a container is affixed to the Fragrance Tag with glue or gummy material, allowing for it's removal and one-time use to experience the full aroma on the consumer's body or clothing. (see, e.g., FIG. 16.)

A product of the invention as a unique combination of brand tag, fragrance, personal care product, or food or beverage, sample, and sweepstakes promotion, all combined in one product. (see, e.g., FIG. 1., FIG. 5.)

A product of the invention as a unique combination of brand tag and fragrance sample, whereby the product is an actual GWP Gift With Purchase product unto itself, being distributed with other products to broaden the marketing reach for the fragrance, personal care, health product, or food or beverage, products. Unique applications of as GWP would be, e.g., but not limited to, clothing, sporting goods, travel gear, beverage cans and bottles and pouches, beer bottles and packaging, music CD's, DVDs, videos, audio files. (see, e.g., FIG. 1, FIG. 5, FIGS. 8-15.)

A product or method of the invention as a unique interactive physiological and psychological sales tool that stimulates the olfactory senses, sending messages to the brain, and motivating the consumer to explore and purchase the fragrance manufacturers wares both online, with mobile devices, and at retail stores. (see, e.g., FIG. 17)

A product of the invention as a unique interactive sales tool, whereby a consumer that does not purchase the product that the fragrance, personal care product, or food or beverage sample tag is affixed to, but is still presented the opportunity to scan the internet URL QR-Code with any smart phone, computer, netbook, internet tablet, or internet connected device with scanning feature, to be directed to the fragrance, personal care product, or food or beverage, manufacturer's or co-marketing partner's web site, web page, contact address or phone number, or any designated internet URL for additional information. (see, e.g., FIG. 21, FIG. 22.)

A necklace as a unique premium promotional product of the invention incorporating A promotional or cross promotional tag or label that can be affixed to a lanyard necklace, or manufactured as an event pass, and distributed at trade events, social networking events, music events, fashion events, and or any indoor or outdoor sales or cultural event to cross-promote designer fragrances with fashion apparel, music, videos, or any other product or service. The lanyard, cord, or chain necklace uses the exclusive printed fragrance delivery system or affixed single-use Designer Fragrance sample wipe or pad packet, in combination with any scan-able interactive internet URL code, MSTAG, or quick response QR-Code that can instantly deliver promotions, contests, videos, music downloads to smart phones, netbooks, computers, scanners, or any internet enabled device with camera function. There is currently no necklace product like this in the market. (see, e.g., FIG. 19, FIG. 19A).

A product of the invention as a single-use fragrance or multiple printed fragrance sampler can be printed on card stock, and sold as postcard product(s). (see, e.g., FIG. 23)

A product of the invention as a revolutionary interactive sales, marketing, or merchandising, tool that goes home with customer, allowing the brand manufacturer to enjoy the benefits of an in-home personalized one-time use of the product, or a "night out on the town" trial use of the product. (see, e.g., FIGS. 1-7, FIG. 16, FIG. 18, FIG. 20).

The use of the interactive scan-able URL code, barcode or QR code on a product of the invention as a user or consumer engages consumers to use their smart phone or other internet access device camera feature to scan the interactive URL scan-able code or QR Quick Response code that links to the manufacturer's brand via distinct URL web address, in conjunction with the consumer interaction with the fragrance, represents two distinct brand impressions not currently available on product hang tags or labels. (see, e.g., FIG. 21, FIG. 22.).

A product of the invention as Multiple Fragrance Hang Tag, produced as printed scent samples on paper with perforated tear off demarcations. Fragrance sampler papers are sealed with fold over flap of paper for preventing evaporation of fragrance. Folded over paper is then folded in an accordion type fashion, into a single stack of fragrances that can be affixed via a tie-back, cord, or pin with cord to products, or sold separately as a stand alone product. (see, e.g., FIG. 20.).

A product of the invention as Promotional Post Card Hang Tag or Post Card Hang Tag Coupon with either a peel up printed fragrance or adhesive adhered wipe or pad fragrance sample on one side of back of the hang tag card, and other side of back of the card has area for writing note, address, and placing stamp. Front of the post card has brand image and special coupon promotion, website address, any interactive URL scan-able code, or Quick Response scan-able QR code that engages consumer with interactive brand experience, special promotions, audio and video media, online or mobile opt-in mailing list form. (see, e.g., FIG. 23) The present invention can also provide for adding one or more holes to the card for hanging on peg at retail also makes it become a large fragrance tag.

A product of the invention as printed, packet wipe or pad configurations can be manufactured as promotional branded jewelry (e.g., but not limited to, earrings, necklaces, lanyard necklaces, bracelets) or event passes that includes a fragrance and interactive QR Quick Response smart phone internet URL code for instant download of coupons, music, promotions, contests, and sweepstakes at any type of event. Particularly at sports and music events, celebrity endorsed exclusive fragrance jewelry can easily be disseminated at events. (see, e.g., FIG. 31).

A product of the invention as an Interactive Auto Hang Tag with printed peel up label to release fragrance, or a fragrance impregnated hang tag with any scan-able URL interactive code such as but not limited to MS-TAG, or QR-Code for cross-marketing any product, or auto accessory store and Designer Fragrance Brand. The auto hang tag is the first fragrance hang tag for automobile use that provides a Designer Fragrance aroma, promotes a brand logo or image, and has interactive QR Quick Response internet URL code that allows drivers to scan the code with smart phones, netbooks, computers, internet tablets, or any camera featured internet connected device, to get instant download of coupons, contests, special promotions, music, video, sponsorship messages, or locations and GPS locations where the fragrance is sold. This inexpensive Designer Fragrance auto hang tag can be sold at automotive accessory retailers, convenience stores, retailers, gas stations, wholesalers, or distributed as a premium product cross-promoting any products including automotive retailer brands, locations, websites and webpages with Designer Fragrance brands. (see, e.g., FIG. 30).

A product of the invention as Direct Mail Coupon Hang Tag Designer Fragrance Coupon designed as a hang tag with cord hole that allows it to be affixed to a gift box. Direct Mail Coupon Hang Tags are inserted into credit card bill envelopes, and use printed peel-up scent samples and any interactive URL scan-able code such as MS TAG or QR Quick Response internet URL codes for engaging consumers with both an olfactory scent experience and interactive brand impression that inspires consumer engagement with fragrance manufacturers website or webpage, for viewing and purchasing products, activating coupons, viewing promotions and cross-promotions, and opting-in for special online or mailed promotions.

POTENTIAL ASPECTS OR ELEMENTS OF THE CLAIMED INVENTION THAT CAN BE OPTIONALLY EXCLUDED OR NEGATIVELY CLAIMED. The present invention can also in particular claimed embodiments exclude or negatively claim one or more aspect of the following list, e.g., to more particularly recite or exclude embodiments or elements that might occur in cited or other published art. Accordingly, the present invention can optionally exclude, not include, or not provide, one of more of promotional, cross promotional, hang tag, tag, label, a particular type of scan-able uniform resource locator (URL)-internet directing code, a particular promotional product sample, product, one or more particular promotional or cross-promotional products or services; one or more promotional or cross-promotional materials related to said one or more promoted or cross-promoted products or services, a particular type of substrate having two or more surfaces, a particular scan-able code provided with, labeled on, affixed to, or provided in scan-able form as provided in a magnetic strip or other data storage device associated with at least one surface of said substrate; one or more sample products provided in a removable or non-removable, provided in one or more of a printed area, sheet, wipe, vial, pouch, packet, patch, container, or pad, associated with, or affixed to, at least a portion of a surface of the substrate; one or more particular types of fastener or attachment means configured to secure the substrate to an external surface or secondary product; one or more of a particular product or product sample selected from one or more of a fragrance, a personal care product, a healthcare product, a food or beverage product, an entertainment product, a toy, a gift card, a booklet, an e-book, software, a website access code, a licensed product, an office supply product, a school supply product, a travel size product, a consumer electronics product, a health and wellness product, a health and beauty product, a medicine product, or an educational product.

The present invention can optionally exclude, not include, or not provide, one of more of a product or product sample in the form of one or more of a solid, a liquid, a gel, an aerosol, a spray, a powder, a pill, a composition, a freeze-dried product, a dehydrated product, a desiccated product, a compound, electronics, recordable memory, or any combination thereof; a substrate selected from paper, plastic, foil, foil coated paper, cardboard, wood, metal, glass, a polymer, cellulose, a postcard, cardstock, or a combination thereof, for which at least a portion of said substrate can optionally be folded, perforated, perforated for tear off demarcations, attached to or provided with a mailed or an electronic bill or statement, detachable, re-attachable, stackable with other portions, or associated with at least one tie-back, cord, pin, fastener, or tie.

The present invention can optionally exclude, not include, or not provide, one of more of a peel able, resealable, closable, re-attachable or removable sheet, removable pad, cover, latch, cap, top, container, or membrane that releases the scent of said one or more products or product samples when peeled, opened, exposed, or removed; one or more brands or product or service descriptions, logos, trademarks, websites, retail locations, said scan-able code, or contact information; a fixative, glue, cut out, latch, or sticky material or compound; at least one selected from a sweepstakes promotion, a rebate, a gift with purchase (GWP), a coupon, a contest, a marketing promotion, a downloadable or orderable free or fee charged music or video, a retail location or a GPS location, a website, an internet URL, a rebate, registration information, or contact information; a GWP selected from a rebate, a coupon, a promotion, or downloadable or physical audio or video media; a bar code, an alphanumeric code, a programmable code, a machine readable code or a readable code image; a product or service provider or promoter website, telephone number, retail location, or contact information; sold or provided as: (i) as a stand alone product, (ii) at retailers in stores and online, or (iii) distributed for free as promotional materials; a lanyard, a cord, a necklace, a bracelet, earrings, a toy, apparel, footwear, keychain, brochure, handout, writing instrument, or novelty promotional item; a product or service gift card, promotion card, internet download card, media download card; label, and hanging card.

It will be clear that the invention can be practiced otherwise than as particularly described in the foregoing description and examples or as interpreted by one skilled in the art or applicable technology areas.

Numerous modifications and variations of the present invention are possible in light of the above teachings and, therefore, are within the scope of the present invention.

What is claimed is:

1. A cross promotional hang tag, tag or label comprising a scan-able and cross promotional uniform resource locator (URL)-internet directing two dimensional code and a cross promotional product sample or product, said cross promotional hang tag, tag, or label attached to, or associated with: (i) a promotional product or service; or (ii) promotional materials related to said promotional product or service, said cross promotional tag comprising:

(a) a substrate having two or more surfaces, one or more of said surfaces being optionally foldable;

(b) a scan-able cross promotional URL internet directing two dimensional code scan-able and linked by a smart phone, internet tablet computer or mobile device to a cross promotional URL including cross promotional information about cross promotional product or service, said cross promotional URL scan-able two dimensional code provided with, printed on, labeled on, or affixed to at least one surface of said substrate;

(c) one or more sample cross promotional products provided in a removable or non-removable printed area, sheet, wipe, vial, pouch, packet, patch, container, or pad associated with, or affixed to, at least a portion of a surface of the substrate; and (d) a fastener or attachment configured to secure the substrate to an external surface of said promotional product or informational material about said promotional service;

wherein the cross-promotional products or services are not the particular type of product or service which the hang tag, tag or label is attached to or associated with as said promotional product or service.

2. A cross promotional hang tag, tag or label according to claim 1, wherein said product sample is selected from the group consisting of a fragrance, a personal care product, a health care product, a food or beverage product, an entertainment product, a toy, a gift card, a book, an e-book, software, a website access code, an office supply product, a school supply product, a travel size product, a consumer electronics product, a health and wellness product, a sporting goods product, an apparel or garment product, a health and beauty product, a medical product, an educational product, an automotive product, an insect repellent, anti-microbial wipes, medical salves, medicines, specialized health & beauty liquids, a lotion, vitamins, drink flavorings, and a candy.

3. A cross promotional hang tag, tag or label according to claim 1, wherein said product sample is in the form of one selected from the group consisting of a solid, a liquid, a gel, an aerosol, a spray, a powder, a pill, a composition, a freeze-dried product, a dehydrated product, a desiccated product, a compound, electronics, recordable memory, and any combination thereof.

4. A cross promotional hang tag, tag or label according to claim 1, wherein said substrate is selected from the group consisting of paper, plastic, foil, foil coated paper, cardboard, wood, metal, glass, a polymer, cellulose, a postcard, cardstock, and a combination thereof, for which at least a portion of said substrate can optionally be folded, perforated, perforated for tear off demarcations, attached to or provided with, a mailed or an electronic bill or statement, detachable, re-attachable, stackable with other portions, or associated with at least one tie-back, cord, pin, fastener, and tie.

5. A cross promotional hang tag, tag or label according to claim 1, wherein said printed area, sheet, wipe, vial, pouch, packet, patch, container, or pad further comprises a peelable, resealable, closible re-attachable, or removable sheet, cover, latch, cap, top, container, or membrane, that releases the scent of said one or more products or product samples when peeled, opened, exposed, or removed.

6. A cross promotional hang tag, tag or label according to claim 1, wherein said substrate is labeled with one or more selected from the group consisting of brands or product or service descriptions, logos, trademarks, websites, retail locations, said scan-able URL internet two dimensional code, and contact information.

7. A cross promotional hang tag, tag or label according to claim 1, wherein said wipe, sheet, vial, packet, pouch, or pad is removably affixed to said substrate with a fixative, glue, cut out, latch, or sticky material or compound.

8. A cross promotional hang tag, tag or label according to claim 1, wherein said product or product sample has a fragrance or composition that can be applied to a user's skin or clothing to continue to provide a fragrance, effect, or experience of said one or more products after removal from said cross promotional tag.

9. A cross promotional hang tag, tag or label according to claim 1, wherein said one or more products or product samples are provided in said vial or container.

10. A cross promotional hang tag, tag or label according to claim 1, wherein said scan-able URL code provides access to the user of at least one selected from a sweepstakes promotion, a rebate, a gift with purchase (GWP), a coupon, a contest, a marketing promotion, a downloadable or orderable free or fee charged music or video, a retail location or a GPS location, a website or web page, a URL, a rebate, registration information, or contact information.

11. A cross promotional hang tag, tag or label according to claim 10, wherein said GWP is selected from any product or service, a rebate, a coupon, a promotion, or downloadable or physical audio or video media.

12. A cross promotional hang tag or label according to claim 1, wherein said scan-able two dimensional code provides internet or telephone access to cross promotional material or to a product or service provider or promoter website or webpage, telephone number, retail location, or contact information.

13. A cross promotional hang tag, tag or label according to claim 1, wherein said cross promotional hang tag, tag or label is sold or provided :(i) as a stand alone product, (ii) at retailers in stores and online, or (iii) as distributed for free as promotional materials.

14. A cross promotional hang tag, tag or label according to claim 1, wherein said cross promotional tag is provided to a consumer or end user comprising or further comprising at least one selected from the group consisting of: a lanyard, a cord, a necklace, a bracelet, earrings, a toy, apparel, footwear, keychain, brochure, handout, writing instrument, clock, compass, and a novelty promotional item.

15. A cross promotional hang tag, tag or label according to claim 1, wherein said promotional tag further comprises, is affixed, is associated with, or is provided with one selected from the group consisting of: a product or service gift card, a promotion card, an internet download card, a media download card, a label, and a hanging card.

16. A cross promotional hang tag, tag or label according to claim 1, wherein said tag is used as a hanging tag for providing a message to third parties in addition to the cross promotional message, product or scan-able URL internet two dimensional code.

17. A cross promotional hang tag, tag, or label according to claim 1, wherein said interactive scan-able URL two dimensional coded tag is a cross-marketing merchandising tool to integrate and cross-promote celebrity brands, products, properties, and licensed properties selected from the group consisting of fragrances, music, music videos, fashion shows, movies, apparel, swim wear, lingerie, menswear, accessories, sports gear, endorsed products, fan club opt-in contact URL's, concerts, TV shows, radio shows, and hyperlinks to social networking services or media sharing services websites.

18. A method of providing a cross promotional hang tag, tag or label comprising a scan-able and promotional uniform resource locator (URL)-internet directing two dimensional code and a cross promotional product sample, said cross promotional tag or label attached to, or associated with: (i) one or more cross-promotional products or services; or (ii) one or more cross-promotional materials related to said one or more cross-promoted products or services, said method comprising:

(a) providing, making or using said cross promotional tag or label, said cross promotional tag or label comprising:

i. a substrate having two or more surfaces, one or more of said surfaces being optionally foldable;

ii. a scan-able cross promotional URL internet directing two dimensional code, said cross promotional URL scan-able by a smart phone, internet table computer or mobile device, said cross promotional URL linked by said smart phone, internet tablet computer or mobile device, and said cross promotional URL including cross promotional information about cross-promotional products or services, said scan-able two dimensional code provided with, labeled on, or affixed to, at least one surface of said substrate;

iii. one or more cross promotional sample products provided in a removable or non-removable printed area, sheet, wipe, vial, pouch, packet, patch, container, or pad associated with, or affixed to, at least a portion of a surface of the substrate; and iv. a fastener or attachment means configured to secure the substrate to an external surface or secondary product;

(b) scanning and linking via a smart phone, internet tablet computer or mobile device, said scan-able URL internet directing two dimensional code to said URL including cross promotional information about said cross-promotional products or services, said scan-able two dimensional code provided with, printed on, labeled on, affixed to at least one surface of said substrate;

wherein the cross-promotional product or service and the cross-promotional sample product are not the particular type of product or service which the hang tag, tag or label is attached to.

* * * * *